(12) United States Patent
Berson et al.

(10) Patent No.: US 7,509,114 B2
(45) Date of Patent: Mar. 24, 2009

(54) REDUNDANT POWERED DEVICE CIRCUIT

(75) Inventors: Yuval Berson, Binyamina (IL); Yair Darshan, Petach Tikva (IL); Dror Korcharz, Bat Yam (IL); Raanan Levi, Ofarim (IL); Alon Ferentz, Bat Yam (IL); Ilan Atias, Haifa (IL); David Pincu, Holon (IL); Shimon Elkayam, Kfar Sava (IL); Arkadiy Peker, New Hyde Park, NY (US)

(73) Assignee: Microsemi Corp. - Analog Mixed Signal Group Ltd., Hod Hasharon (IL)

( * ) Notice: Subject to any disclaimer, the term of this patent is extended or adjusted under 35 U.S.C. 154(b) by 337 days.

(21) Appl. No.: 11/218,607

(22) Filed: Sep. 6, 2005

(65) Prior Publication Data

US 2006/0019629 A1 Jan. 26, 2006

Related U.S. Application Data

(63) Continuation-in-part of application No. 10/761,327, filed on Jan. 22, 2004, now Pat. No. 7,492,059, and a continuation-in-part of application No. 11/036,063, filed on Jan. 18, 2005, now Pat. No. 7,299,368, and a continuation-in-part of application No. 11/053,872, filed on Feb. 10, 2005, now Pat. No. 7,460,889.

(60) Provisional application No. 60/608,874, filed on Sep. 13, 2004.

(51) Int. Cl.
*H04M 9/00* (2006.01)
*H04B 7/185* (2006.01)
*H04B 1/38* (2006.01)
*H01Q 11/12* (2006.01)

(52) U.S. Cl. .................... 455/402; 455/13.4; 455/127.1; 455/572

(58) Field of Classification Search ................. 455/572, 455/423, 13.4, 127.1; 370/340
See application file for complete search history.

(56) References Cited

U.S. PATENT DOCUMENTS 5,266,838 A 11/1993 Gerner (Continued)

FOREIGN PATENT DOCUMENTS

WO PCT/IL2005/000941 9/2005

OTHER PUBLICATIONS

Int'l Search Report, Jan. 10, 2006, Berson et al.

(Continued)

*Primary Examiner*—Nick Corsaro
*Assistant Examiner*—Shannon R Brooks
(74) *Attorney, Agent, or Firm*—Simon Kahn

(57) ABSTRACT

A redundant powering system for a powered device receiving power over communication cabling, the redundant powering system comprising: a redundant power supply comprising a first power sourcing equipment and a second power sourcing equipment; a powered device; communication cabling connecting the redundant power supply to the powered device, the communication cabling comprising a first path connecting the first power sourcing equipment to the powered device and a second path connecting the second power sourcing equipment to the powered device, the first and second paths at least partially being constituted of a single structured cable, the at least one powered device comprising at least one signature impedance, the redundant power supply being operable so that power is operably supplied to the powered device from only one of the first and second power sourcing equipment.

21 Claims, 15 Drawing Sheets

U.S. PATENT DOCUMENTS

| | | | |
|---|---|---|---|
| 5,834,925 A | 11/1998 | Chesavage | |
| 5,844,327 A | 12/1998 | Batson | |
| 5,914,585 A | 6/1999 | Grabon | |
| 6,009,000 A | 12/1999 | Siri | |
| 6,115,468 A | 9/2000 | De Nicolo | |
| 6,121,693 A | 9/2000 | Rock | |
| 6,153,946 A | 11/2000 | Koch et al. | |
| 6,377,874 B1 | 4/2002 | Ykema | |
| 6,473,608 B1 | 10/2002 | Lehr et al. | |
| 6,535,983 B1 | 3/2003 | McCormack et al. | |
| 6,628,011 B2 | 9/2003 | Droppo et al. | |
| 6,643,566 B1 | 11/2003 | Lehr et al. | |
| 6,665,404 B2 | 12/2003 | Cohen | |
| 7,061,142 B1 * | 6/2006 | Marshall | 307/106 |
| 2002/0079962 A1 | 6/2002 | Sander | |
| 2003/0099076 A1 * | 5/2003 | Elkayam et al. | 361/90 |
| 2003/0141907 A1 | 7/2003 | Canova et al. | |
| 2003/0147381 A1 * | 8/2003 | Nelson et al. | 370/352 |
| 2005/0132240 A1 * | 6/2005 | Stineman et al. | 713/300 |

OTHER PUBLICATIONS

Written Opinion both for equivalent PCT case, Jan. 10, 2006, Berson et al.

IEEE 802.3af-2003 Standard—"Data Terminal Equipment Power via Media Dependent Interface"; IEEE—New York, N.Y.; Jun. 18, 2003.

Office Action dated Nov. 28, 2008 from parallel UK Patent Application GB0704626.1.

* cited by examiner

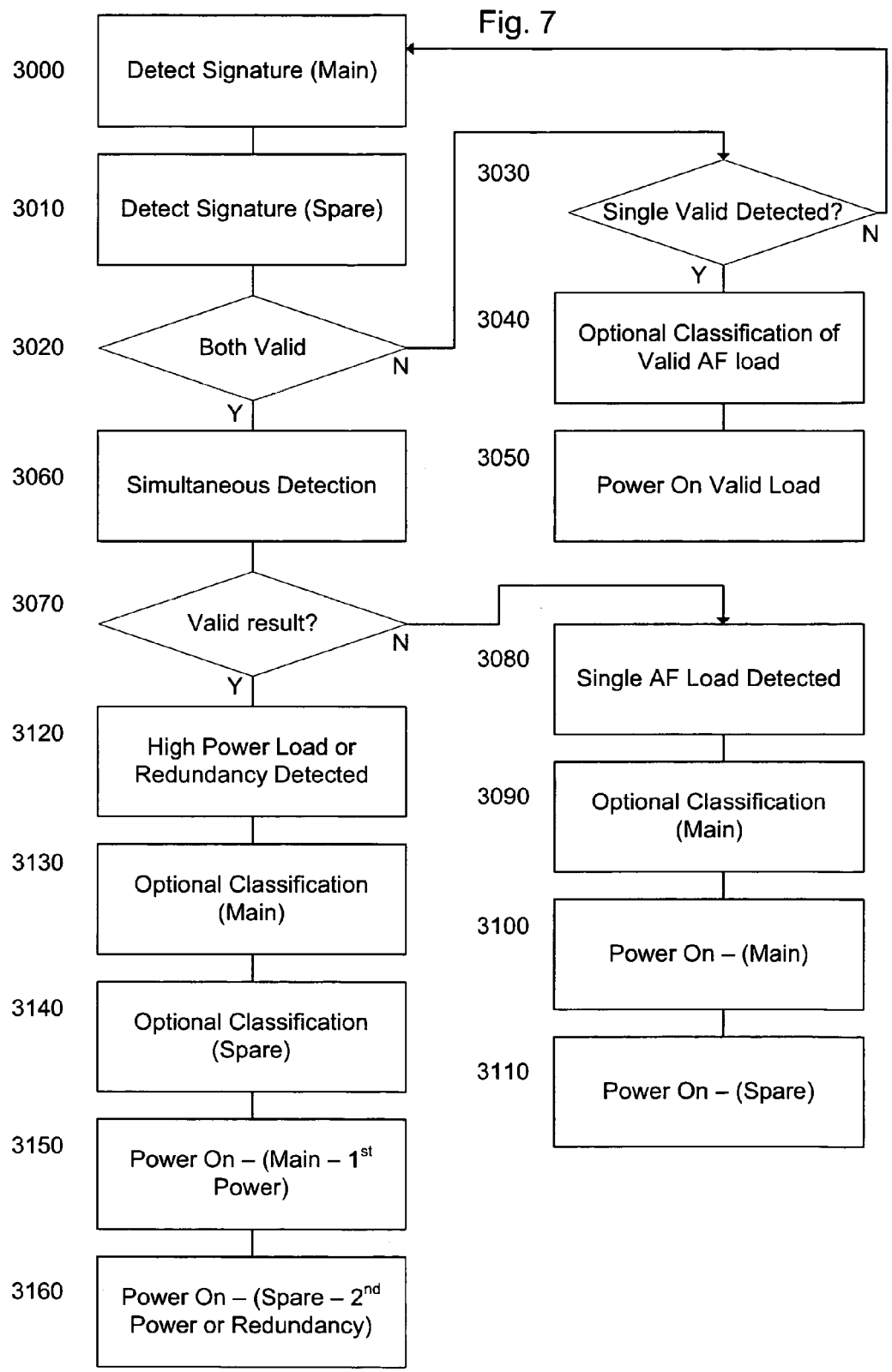

REDUNDANT POWERED DEVICE CIRCUIT

CROSS-REFERENCE TO RELATED APPLICATIONS

This application claims priority from U.S. Provisional Patent Application Ser. No. 60/608,874 filed Sep. 13, 2004 entitled "Redundant Powered Device Circuit", the entire contents of which are incorporated herein by reference, and is a continuation-in-part of U.S. patent application Ser. No. 10/761,327 filed Jan. 22, 2004 entitled "High Power Architecture for Power over Ethernet", U.S. patent application Ser. No. 11/036,063 filed Jan. 18, 2005 now U.S. Pat. No. 7,299,368 entitled "High Power Architecture for Power over Ethernet", and U.S. patent application Ser. No. 11/053,872 filed Feb. 10, 2005 entitled "HIGH POWER CLASSIFICATION FOR POWER OVER ETHERNET" the entire contents of each of which are incorporated herein by reference.

BACKGROUND OF THE INVENTION

The invention relates generally to the field of power over local area networks, particularly Ethernet based networks, and more particularly to a redundant powering system of a device powered over communication cabling.

The growth of local and wide area networks based on Ethernet technology has been an important driver for cabling offices and homes with structured cabling systems having multiple twisted wire pairs. The ubiquitous local area network, and the equipment which operates thereon, has led to a situation where there is often a need to attach a network operated device for which power is to be advantageously supplied by the network over the network wiring. Supplying power over the network wiring has many advantages including, but not limited to: reduced cost of installation; centralized power and power back-up; and centralized security and management.

The IEEE 802.3af-2003 standard, whose contents are incorporated herein by reference, is addressed to powering remote devices over an Ethernet based network. Power, with a maximum of 12.95 watts, can be delivered to the powered device (PD) either directly from the switch/hub known as an endpoint power sourcing equipment (PSE) or alternatively via a midspan PSE. The term PD comprises a LAN node receiving power over the communication equipment. Unfortunately, no provision has been made in the above standard for PDs requiring power in excess of the above maximum power requirement. Furthermore, no provision has been made in the above standard for redundancy, i.e. a secondary PSE and path for powering the PD upon failure of the primary PSE. A redundant powering system would enhance reliability ensuring near constant operation, preferably to a level of 99.999% (Five 9's reliability). One important market for powering devices over Ethernet cabling is IP telephony, which is typically utilized to replace highly reliable enterprise wide telephone equipment. Often the enterprise wide telephone equipment to be replaced exhibits five 9's reliability, and as such, ensuring reliability of an enterprise IP telephone network is a critical feature.

The above mentioned standard further requires that a PD be capable of accepting power on either of two powering paths: a first path comprising conductors 1, 2, 3 and 6; and a second path comprising conductors 4, 5, 7 and 8. The PD is to be implemented so as to be insensitive to the polarity of the power supply. In an exemplary embodiment a PD according to the above standard exhibits a diode bridge at the input thus implementing this requirement.

In a typical application, a PD comprises a PD interface circuitry and a PD operational circuitry. The PD interface circuitry enables detection and optional classification in accordance with the above standard. Power is isolated by the PD interface circuitry from the PD operational circuitry through an isolating switch, and is enabled to the PD operational circuitry only after the voltage at the PD, supplied from the PSE via the communication cabling, rises to $V_{on}$. One function of the PD interface circuitry is thus to close the isolating switch thereby enabling operation of the PD operational circuitry. In a typical application, the output of the isolating switch is fed to the input of a DC/DC converter, and the output of the DC/DC converter powers the PD operational circuitry.

The standard further prescribes a power turn on time, designated $t_{pon}$. In the event that the PSE powers the PD, power is to be supplied within $t_{pon}$ of a valid detection. Once steady state powering has begun a disconnect detection function is to be active. The PSE may monitor an AC maintain power signature (MPS) component only, a DC MPS component only or both the AC and the DC MPS components. Power is to be removed from a PD in the absence of a valid MPS.

U.S. patent application Ser. No. 10/761,327 filed Jan. 22, 2004 entitled "High Power Architecture for Power Over Ethernet", whose contents are incorporated herein by reference, is addressed to the issue of supplying power in excess of the above mentioned limit of 12.95 watts per PD.

It would therefore be desirable to have a redundant powering system for powering a PD over communication cabling.

SUMMARY OF THE INVENTION

Accordingly, it is a principal object of the present invention to overcome the disadvantages of prior art. This is provided in the invention by enabling redundant powering of a PD via two PSEs each having a separate path over communication cabling to a PD. In the event of an outage of one of the two PSEs, or of the failure of any portion of the path from one of the two PSEs, power is supplied by the second of the two PSEs. In one embodiment the second of the two PSEs, operating as a backup or redundant PSE, receives a valid maintain power signature from the PD thus ensuring availability. In another embodiment the second of the two PSEs receives data regarding the operation of the first PSE, and ensures availability on the back-up path in the absence of a valid maintain power signature.

The invention provides for a redundant powering system for a powered device receiving power over communication cabling, the redundant powering system comprising: a redundant power supply comprising a first power sourcing equipment and a second power sourcing equipment; a powered device; and communication cabling connecting the redundant power supply to the powered device, the communication cabling comprising a first path connecting the first power sourcing equipment to the powered device and a second path connecting the second power sourcing equipment to the powered device, the first and second paths at least partially being constituted of a single structured cable, the powered device comprising at least one signature impedance, the redundant power supply being operable so that power is operably supplied to the powered device from only one of the first and second power sourcing equipment.

In one embodiment the first power sourcing equipment is operable to supply power via the first path to the powered device and the second power sourcing equipment is operable to remain in a standby mode, the second power sourcing equipment being operable to supply power to the powered device only in the event that the first power sourcing equipment does not supply power to the powered device. In one further embodiment the powered device comprises a maintain power signature circuit operable to generate a maintain power signature on the second path, the second power sourcing equipment remaining in the standby mode at least partially responsive to the generated maintain power signature. In another further embodiment the standby mode comprises an active power output.

In one embodiment at least one of the first power sourcing equipment and the second power sourcing equipment is operable to perform detection of the at least one signature impedance. In another embodiment the first power sourcing equipment and the second power sourcing equipment are each operable to perform detection of the at least one signature impedance, the first power sourcing equipment and the second power sourcing equipment being operable to perform the detection at non-overlapping times.

In one embodiment the first power sourcing equipment and the second power sourcing equipment are located within separate chassis. In another embodiment the first power sourcing equipment and the second power sourcing equipment are interchangeable. In another embodiment the powered device comprises: a first diode bridge operatively connected to the first path; a second diode bridge operatively connected to the second path; and operating circuitry, the outputs of the first and second diode bridges being operatively connected to the operating circuitry via a common connection.

In one embodiment at least one of the first power sourcing equipment and the second power sourcing equipment is integral with switch/hub equipment. In another embodiment at least one of the first power sourcing equipment and the second power sourcing equipment is integral with midspan power insertion equipment.

The invention also provides for a method of redundant powering of a powered device over communication cabling comprising: supplying a first power sourcing equipment; supplying a second power sourcing equipment; supplying a powered device comprising at least one signature impedance; supplying communication cabling connecting the first power sourcing equipment and the second power sourcing equipment to the powered device, the communication cabling comprising a first path connecting the first power sourcing equipment to the powered device and a second path connecting the second power sourcing equipment to the powered device, the first path and the second path being part of a single common cable; detecting by the first power sourcing equipment the signature impedance; powering the powered device from the first power sourcing equipment via the first path; and in the event of failure of the first power sourcing equipment to supply power via the first path, powering the at least one powered device from the second power sourcing equipment via the second path without requiring detection subsequent to the failure event.

In one embodiment the method further comprises detecting by the second power sourcing equipment the at least one signature impedance. In another embodiment the detecting by the first power sourcing equipment and the detecting by the second power sourcing equipment are at non-overlapping times.

In one embodiment the provided first power sourcing equipment and the provided second power sourcing equipment are located within separate chassis. In another embodiment the provided first power sourcing equipment and the provided second power sourcing equipment are interchangeable.

In one embodiment the method further comprises operatively connecting the output of the first path to the output of the second path via at least one diode bridge so as to power a load of the provided at least powered device. In another embodiment the method further comprises maintaining the second power sourcing equipment in a standby mode.

In one embodiment the method further comprises providing a maintain power signature via the second path to the second power sourcing equipment, the second power sourcing equipment being maintained in the standby mode at least partially responsive to the maintain power signature. In another embodiment at least one of the provided first power sourcing equipment and the provided second power sourcing equipment is integral with switch/hub equipment. In yet another embodiment at least one of the provided first power sourcing equipment and the provided second power sourcing equipment is integral with midspan power insertion equipment.

The invention independently provides for a redundant powering system comprising: a first power sourcing equipment; a second power sourcing equipment; a powered device; a first path comprising communication cabling connecting the first power sourcing equipment to the powered device; and a second path comprising communication cabling connecting the second power sourcing equipment to the powered device, the first and second paths at least partially being constituted of a single structured cable, wherein the powered device comprises at least one signature impedance, and the redundant power supply is operable so that power is supplied to the powered device from the first power sourcing equipment via the first path and the second power sourcing equipment is operable to remain in a standby mode, the second power sourcing equipment being operable to supply power to the powered device via the second path only in the event that the first power sourcing equipment does not supply power to the powered device, the second power sourcing equipment supplying the power without requiring detection subsequent to the first power sourcing equipment not supplying power.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 7 illustrates a flow chart of the operation of switch/hub equipment and midspan equipment of FIGS. 2a-2c according to the principle of the invention when the type of powered end station is unknown.

DETAILED DESCRIPTION OF THE PREFERRED EMBODIMENTS

Figure 1A:
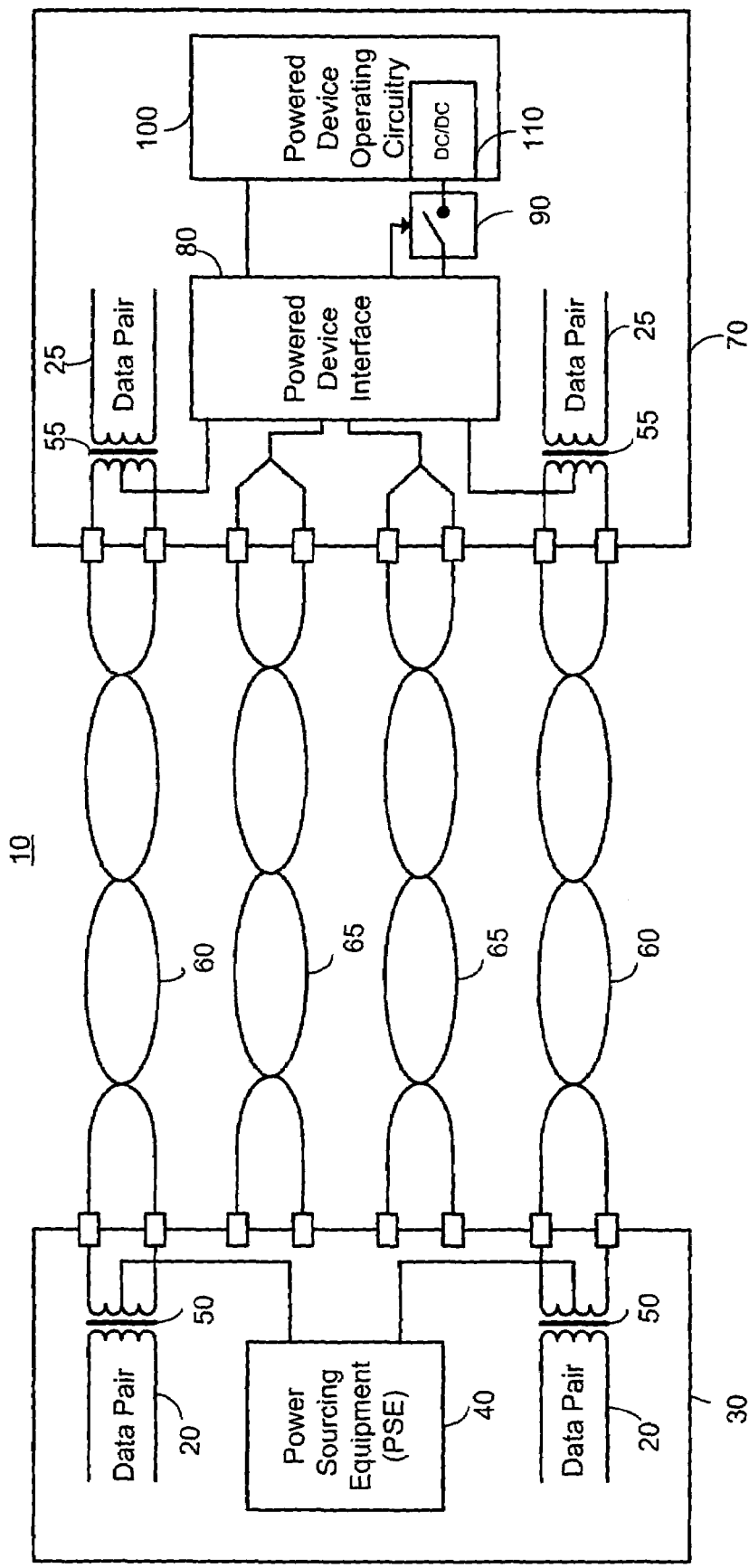
FIG. 1a illustrates a high level block diagram of a first alternative network configuration for remote powering from an endpoint PSE known to the prior art.

The present embodiments enable redundant powering of a PD by providing at least two PSEs each having a separate path over communication cabling for powering the PD. In the event of an outage of a first one of the two PSEs, or of the failure of any portion of the path from the first one of the two PSEs, power is supplied by the second of the two PSEs. In one embodiment the second of the two PSEs, operating as a backup, spare, reserve or redundant PSE, receives a valid maintain power signature from the PD thus ensuring availability. In another embodiment the second of the two PSEs receives data regarding the operation of the first PSE, and ensures availability on the back-up path in the absence of a valid maintain power signature. Preferably and advantageously, the redundant PSE exhibits an active power output irrespective of a valid MPS, thus power may be drawn immediately upon failure of the first PSE without requiring a subsequent detection.

In yet another embodiment a portion of the demand is supported by a first one of the two PSEs and the balance of the demand is supported by a second one of the two PSEs. The load sharing reduces the stress on each of the two PSEs.

The first and second PSEs may be supplied in a single enclosure or in separate enclosures. The first and second PSEs may be two outputs of a single PSE, or may be fully isolated from each other.

The terms powered end device and PD are herein used interchangeably. The PD comprises an interface circuit and operating circuitry. The interface circuitry provides the IEEE 802.3af functionality to enable the powering of the PD over communication cabling. PD operational circuitry in accordance with the invention may comprise any of: desktop computer; web camera; facsimile machine; IP telephone; computer; server; wireless LAN access point; emergency lighting system element; paging loudspeaker; CCTV camera; alarm sensor; door entry sensor; access control unit; laptop computer; hub; switch; router; monitor; memory back up unit for workstation; and memory back up unit for a computer.

The term redundant powering is meant to include any arrangement in which a second power sourcing equipment supplies power to replace, or back up, a main power sourcing equipment which is no longer supplying power. This may be caused by a connection failure, a failure of the main power sourcing equipment, or a sensed malfunction such as an increase in temperature of the main power sourcing equipment, without exceeding the scope of the invention. A redundant PSE is also known as a backup, spare or reserve PSE and the terminology is used interchangeably throughout this document.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The invention is being described as an Ethernet based network, with a powered device being connected thereto. It is to be understood that the PD is preferably an IEEE 802.3 compliant device preferably employing a 10Base-T, 100Base-T or 1000Base-T connection.

FIG. 1a illustrates a high level block diagram of a first alternative network configuration 10 for remote powering from an endpoint PSE known to the prior art. Network configuration 10 comprises: a switch/hub equipment 30 comprising a first and second data pair 20, a power sourcing equipment (PSE) 40, and a first and second transformer 50; a first and second twisted pair data connection 60; a first and second spare twisted pair connection 65; and a powered end station 70 comprising a first and second transformer 55, a first and second data pair 25, a PD interface 80, a switch 90 and a PD operating circuitry 100. PD operating circuitry 100 preferably comprises a DC/DC converter 110.

The primary of each of first and second transformers 50 carry respective data pairs 20. An output and return of PSE 40 are connected, respectively, to the center tap of the secondary of first and second transformers 50. The output leads of the secondary of first and second transformers 50 are each connected to a first end of first and second twisted pair data connections 60, respectively. The second end of first and second twisted pair data connections 60, are respectively connected to the primary of first and second transformers 55 located within powered end station 70. The center tap of the primary of each of first and second transformers 55 is connected to a respective input of PD interface 80. An output of PD interface 80 is connected to PD operating circuitry 100. The return of PD interface 80 is connected to PD operating circuitry 100 through switch 90 at the input to DC/DC converter 110. Switch 90 is operable by PD interface 80. The secondary of each of first and second transformers 55 carry respective data pairs 25.

In operation, PSE 40 supplies power over first and second twisted pair data connection 60, thus supplying both power and data over first and second twisted pair data connections 60 to PD interface 80. First and second spare twisted pair connections 65 are not utilized, and are available as spare connections. First and second spare twisted pair connections 65 are shown connected to PD interface 80 to allow operation alternatively in a manner that will be described further hereinto below in relation to FIG. 1*b*. PD interface 80 enables detection and classification in accordance with the relevant standard, preferably IEEE 802.3af. Once power is supplied by PSE 40 to PD interface 80, PD interface 80 operates switch 90 to enable operation of PD operating circuitry 100. DC/DC converter 110 is illustrated at the input to PD operating circuitry 100, however this is not meant to be limiting in any way. DC/DC converter 110 may be located externally of PD operating circuitry 100, within PD interface 80 or may not be present. In an exemplary embodiment, switch 90 comprises an n-channel FET.

Figure 1B:
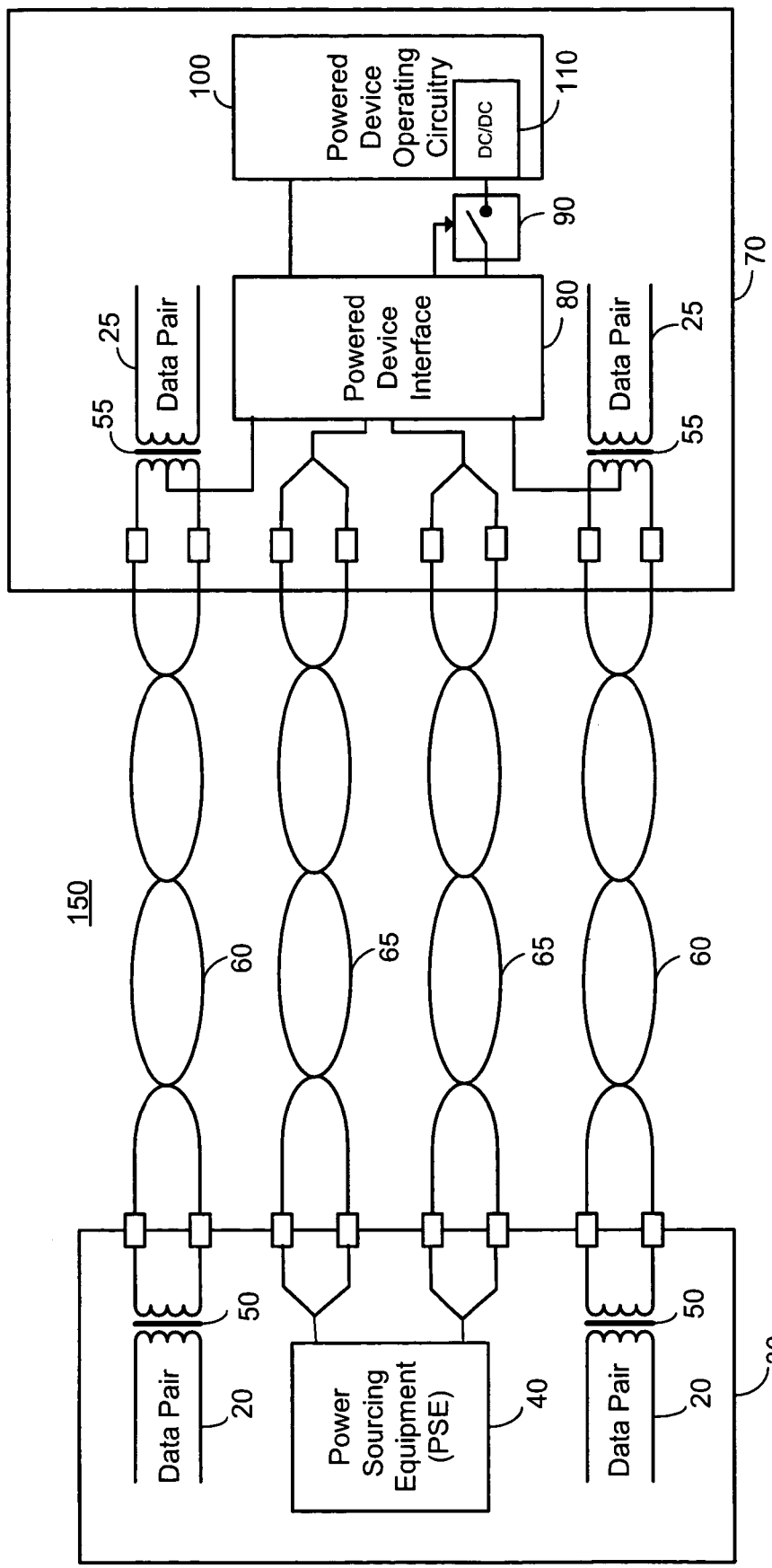
FIG. 1b illustrates a high level block diagram of a second alternative network configuration for remote powering from an endpoint PSE known to the prior art.

FIG. 1*b* illustrates a high level block diagram of a second alternative network configuration 150 for remote powering from an endpoint PSE known to the prior art. Network configuration 150 comprises: a switch/hub equipment 30 comprising a first and second data pair 20, a PSE 40 and a first and second transformer 50; a first and second twisted pair data connection 60; a first and second spare twisted pair connection 65; and a powered end station 70 comprising a first and second transformer 55, a first and second data pair 25, a PD interface 80, a switch 90 and a PD operating circuitry 100. PD operating circuitry 100 preferably comprises a DC/DC converter 110.

The primary of each of first and second transformers 50 carry respective data pairs 20. The output leads of the secondary of first and second transformers 50 are each connected to a first end of first and second twisted pair data connections 60, respectively. An output of PSE 40 is connected to both leads of first spare twisted pair connection 65 and a return of PSE 40 is connected to both leads of second spare twisted pair connection 65. The second end of each of first and second twisted pair data connection 60 is connected to the primary of first and second transformer 55, respectively, located within powered end station 70. The center tap of the primary of each of first and second transformer 55 is connected to respective inputs of PD interface 80. The second end of first and second spare twisted pair connections 65 are respectively connected to an input and return of PD interface 80. An output of PD interface 80 is connected to PD operating circuitry 100. The return of PD interface 80 is connected to PD operating circuitry 100 through switch 90 at the input to DC/DC converter 110. Switch 90 is operable by PD interface 80. The secondary of each of first and second transformers 55 carry respective data pairs 25.

In operation PSE 40 supplies power to PD interface 80 over first and second spare twisted pair connection 65, with data being supplied over first and second twisted pair data connection 60. Power and data are thus supplied over separate connections, and are not supplied over a single twisted pair connection. The center tap connection of first and second transformer 55 is not utilized, but is shown connected in order to allow operation alternatively as described above in relation to FIG. 1*a*. The configurations of FIG. 1*a* and FIG. 1*b* thus allow for powering of powered end station 70 by PSE 40 either over the set of twisted pair data connections 60 utilized for data communications, or over the set of spare twisted pair connections 65 not utilized for data communications.

PD interface 80 supplies the required detection signature resistance and optional classification current. In an exemplary embodiment, the detection signature resistance and optional classification are in accordance with the applicable standard IEEE 802.3af. After detection and optional classification, PD interface 80 closes switch 90 thereby enabling power to PD operating circuitry 100. In an exemplary embodiment, switch 90 comprises an n-channel FET.

Figure 1C:
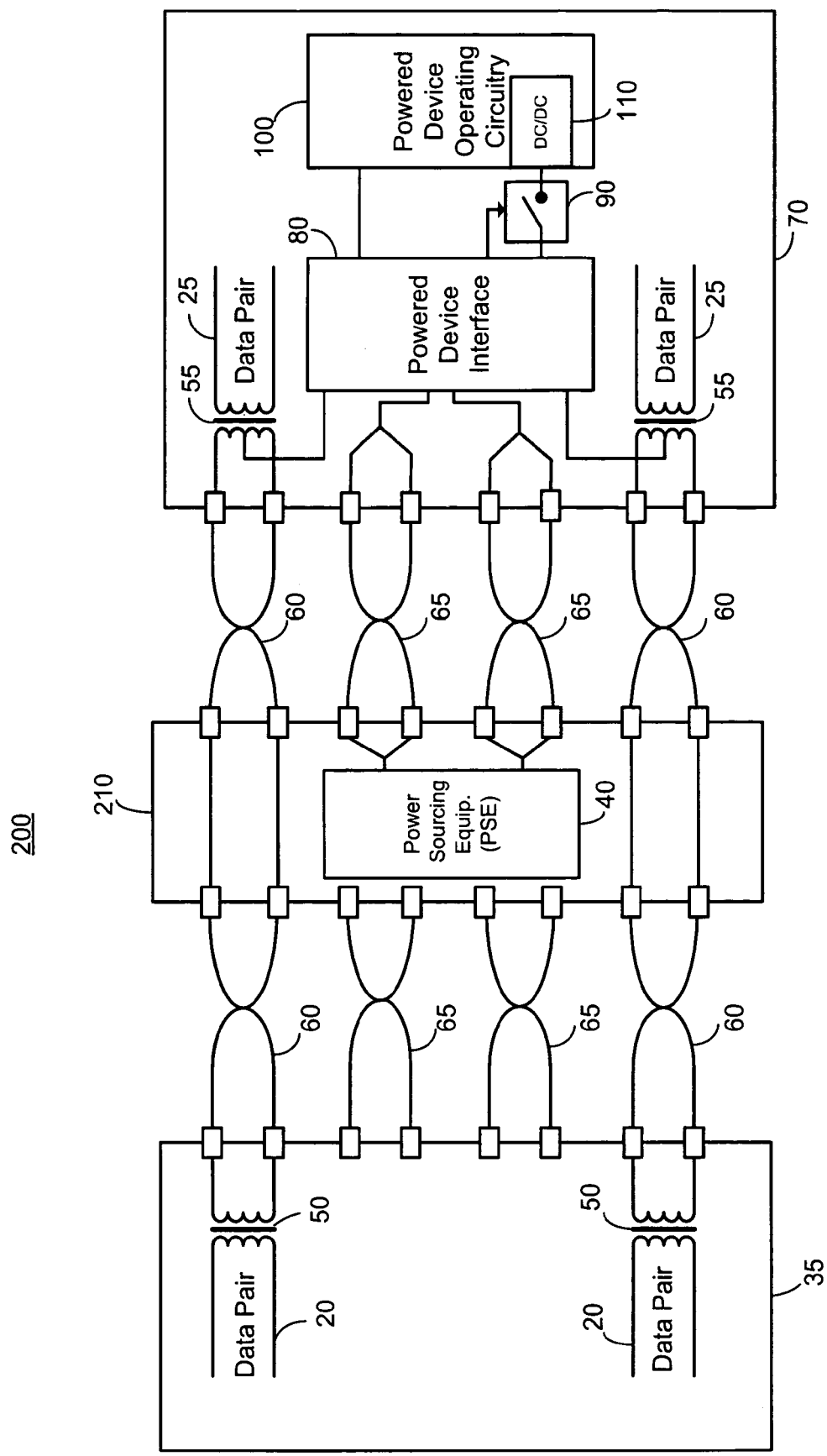
FIG. 1c illustrates a high level block diagram of an alternative network configuration for remote powering from a midspan PSE known to the prior art.

FIG. 1*c* illustrates a high level block diagram of an alternative network configuration 200 for remote powering from a midspan PSE known to the prior art. Network configuration 200 comprises: a switch/hub equipment 35 comprising a first and second data pair 20 and a first and second transformer 50; a first through fourth twisted pair data connection 60; a first through fourth spare twisted pair connection 65; a midspan power insertion equipment 210 comprising a PSE 40; a powered end station 70 comprising a first and second transformer 55, a first and second data pair 25, a PD interface 80, a switch 90 and a PD operating circuitry 100. PD operating circuitry 100 preferably comprises a DC/DC converter 110.

The primary of each of first and second transformers 50 carry respective data pairs 20. The output leads of the secondary of first and second transformers 50 are connected, respectively, to a first end of each of first and second twisted data pair connections 60. The second end of each of first and second twisted data pair connections 60 are connected as a straight through connection through midspan power insertion equipment 210 to a first end of third and fourth twisted pair data connections 60, respectively. A second end of each of third and fourth twisted pair data connections 60 are connected to the primary of first and second transformers 55, respectively, located within powered end station 70. First and second spare twisted pair connections 65 are shown connected between switch/hub 30 and midspan power insertion equipment 210, however no internal connection to either first or second spare twisted pair connection 65 is made.

An output of PSE 40 is connected to both leads of one end of third spare twisted pair connection 65 and a return of midspan PSE 40 is connected to both leads of one end of fourth spare twisted pair connection 65. The second end of both leads of third and fourth spare twisted pair connections 65 respectively, are connected to a power input and return of PD interface 80. An output of PD interface 80 is connected to PD operating circuitry 100. The return of PD interface 80 is connected to PD operating circuitry 100 through switch 90 at the input to DC/DC converter 110. Switch 90 is operable by PD interface 80. The secondary of each of first and second transformers 55 carry respective data pairs 25. The center tap of the primary of each of first and second transformers 55 is connected to respective inputs of PD interface 80.

In operation PSE 40 of midspan power insertion equipment 210 supplies power to powered end station 70 over third and fourth spare twisted pair connections 65, with data being supplied from switch/hub equipment 35 over first and second twisted pair data connections 60 through midspan power insertion equipment 210 to third and fourth twisted pair data connections 60. Power and data are thus supplied over separate connections, and are not supplied over a single twisted pair connection. The center tap connection of first and second transformers 55 is not utilized, but is shown connected in order to allow operation alternatively as described above in relation to FIG. 1a.

PD interface 80 supplies the required detection signature resistance and optional classification current. In an exemplary embodiment, the detection signature resistance and optional classification are in accordance with the applicable standard IEEE 802.3af. After detection and optional classification, PD interface 80 closes switch 90 thereby enabling power to PD operating circuitry 100. In an exemplary embodiment, switch 90 comprises an n-channel FET.

Figure 2A:
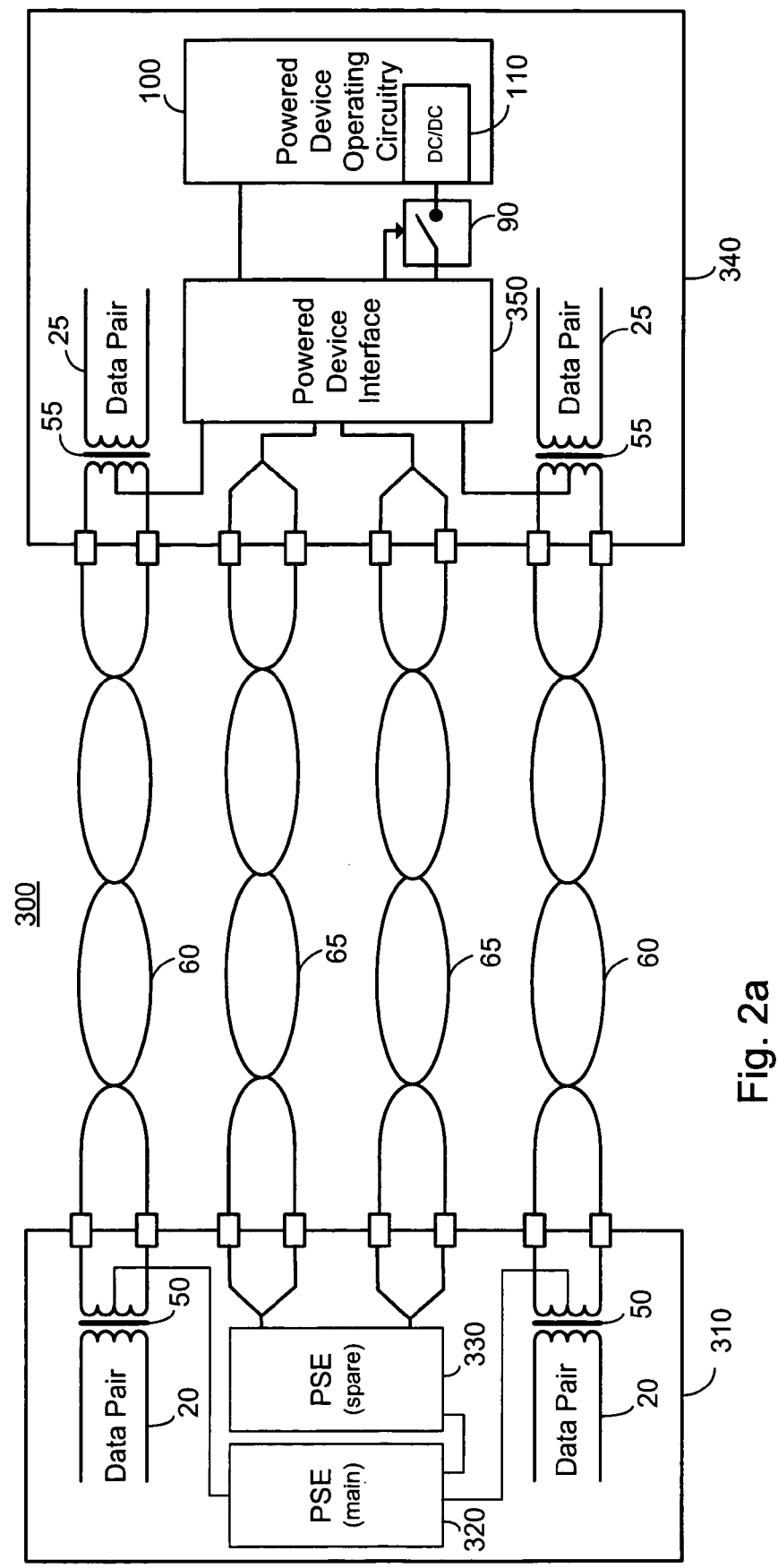
FIG. 2a illustrates a high level block diagram of an embodiment of redundant endpoint based PD powering according to the principle of the current invention.

FIG. 2a illustrates a high level block diagram of an embodiment of redundant endpoint based PD powering configuration 300 according to the principle of the current invention. Configuration 300 comprises: a switch/hub equipment 310 comprising a first and second data pair 20, a main PSE 320, a spare PSE 330, and a first and second transformer 50; a first and second twisted pair data connection 60; a first and second spare twisted pair connection 65; and a powered end station 70 comprising a first and second transformer 55, a first and second data pair 25, a PD interface 350, a switch 90 and a PD operating circuitry 100. PD operating circuitry 100 preferably comprises a DC/DC converter 110.

The primary of each of first and second transformers 50 carry respective data pairs 20. An output and return of main PSE 320 are connected, respectively, to the center tap of the secondary of first and second transformers 50. An output of spare PSE 330 is connected to both leads of a first end of first spare twisted pair connection 65 and the return of spare PSE 330 is connected to both leads of a first end of second spare twisted pair connection 65. An optional data connection is provided between main PSE 320 and spare PSE 330. A second end of both leads of respective first and second spare twisted pair connection 65 is connected to inputs of PD interface 350.

The output leads of the secondary of first and second transformers 50 are each connected to a respective first end of first and second twisted pair data connections 60. The second end of first and second twisted pair data connections 60, are respectively connected to the primary of first and second transformers 55 located within powered end station 340. The center tap of the primary of each of first and second transformers 55 is connected to a respective input of PD interface 350. An output of PD interface 350 is connected to PD operating circuitry 100. The return of PD interface 350 is connected to PD operating circuitry 100 through switch 90 at the input to DC/DC converter 110. Switch 90 is operable by PD interface 350. The secondary of each of first and second transformers 55 carry respective data pairs 25.

In operation, main PSE 320 supplies power over first and second twisted pair data connection 60, thus both power and data are supplied over first and second twisted pair data connections 60 to PD interface 350. Spare PSE 330 is connected to supply power in the event of a failure of main PSE 320. Spare PSE 330 supplies power as required over first and second spare twisted pair connections 65. PD interface 350 enables detection and classification in accordance with the relevant standard, preferably IEEE 802.3af. In one embodiment PD interface 350 enables detection and classification by each of main PSE 320 and spare PSE 330 as will be explained further hereinto below. In one embodiment, PD interface 350 maintains a valid maintain power signature (MPS) to spare PSE 330 thus ensuring available power in the event of a failure of main PSE 320. In another embodiment, no valid MPS is supplied, and spare PSE 330 receives data or commands from main PSE 320 via the optional data connection or from a host or controller (not shown) to maintain power in a standby powering mode without regard to a valid MPS thus ensuring power availability in the event of a failure of main PSE 320. Preferably and advantageously the standby powering mode, or standby mode, exhibits an active power output. No additional subsequent detection phase is required for spare PSE 330 to supply power in the event of a failure of main PSE 320 to supply power.

Once power is supplied by main PSE 320 to PD interface 350, PD interface 350 operates switch 90 to enable operation of PD operating circuitry 100. DC/DC converter 110 is illustrated at the input to PD operating circuitry 100, however this is not meant to be limiting in any way. DC/DC converter 110 may be located externally of PD operating circuitry 100, within PD interface 350 or may not be present.

PD interface 350 supplies the required detection signature resistance and optional classification current to main PSE 320. In an exemplary embodiment, the detection signature resistance and optional classification are in accordance with the applicable standard IEEE 802.3af. After detection and optional classification, PD interface 350 closes switch 90 thereby enabling power to PD operating circuitry 100. In an exemplary embodiment, switch 90 comprises an n-channel FET. As indicated above in one embodiment PD interface 350 supplies the required detection resistance and optional classification current to spare PSE 330. In one embodiment PD interface 350 further supplies a valid MPS to spare PSE 330 thus maintaining spare powering.

Network configuration 300 has been illustrated with main PSE 320 being connected to supply data and power over first and second twisted pair data connections 60, with redundant power from spare PSE 330 supplied over first and second spare twisted pair connections 65, however this is not meant to be limiting in any way. Main power from main PSE 320 may be supplied over first and second spare twisted pair connections 65 with redundant power from spare PSE 330 being supplied over first and second twisted pair data connections 60 without exceeding the scope of the invention. In another embodiment power may be supplied simultaneously over both first and second twisted pair data connections 60 and first and second spare twisted pair connections 65 thus allowing for load sharing between main PSE 320 and spare PSE 330. Main PSE 320 and spare PSE 330 may be separate outputs of a single combined PSE, or more preferably may represent separate isolated redundant sources. Main PSE 320 and spare PSE 330 may optionally be enclosed in a single chassis, supplied in different chassis in a single rack, or supplied in separate racks from separate power sources (not shown) without exceeding the scope of the invention.

Optional data communication between main PSE 320 and spare PSE 330 may be accomplished by a current sensor, voltage sensor or data communication. In an exemplary embodiment a single controller or host (not shown) determines the operation of main PSE 320 and spare PSE 330. In another embodiment a plurality of redundant controllers control the operation of main PSE 320 and spare PSE 330. The optional data communication thus provides, without limitation, a means for determining which of the PSEs is to be main PSE 320 and which is to be spare PSE 330. The optional data communication further provides, without limitation, synchronization of operation, timing coordination, and optimization of main PSE 320 and spare PSE 330. Furthermore, optional data communication provides a means for load sharing between main PSE 320 and spare PSE 330, as well as sharing and or comparing detection and classification information as will be described further hereinto below.

Figure 2B:
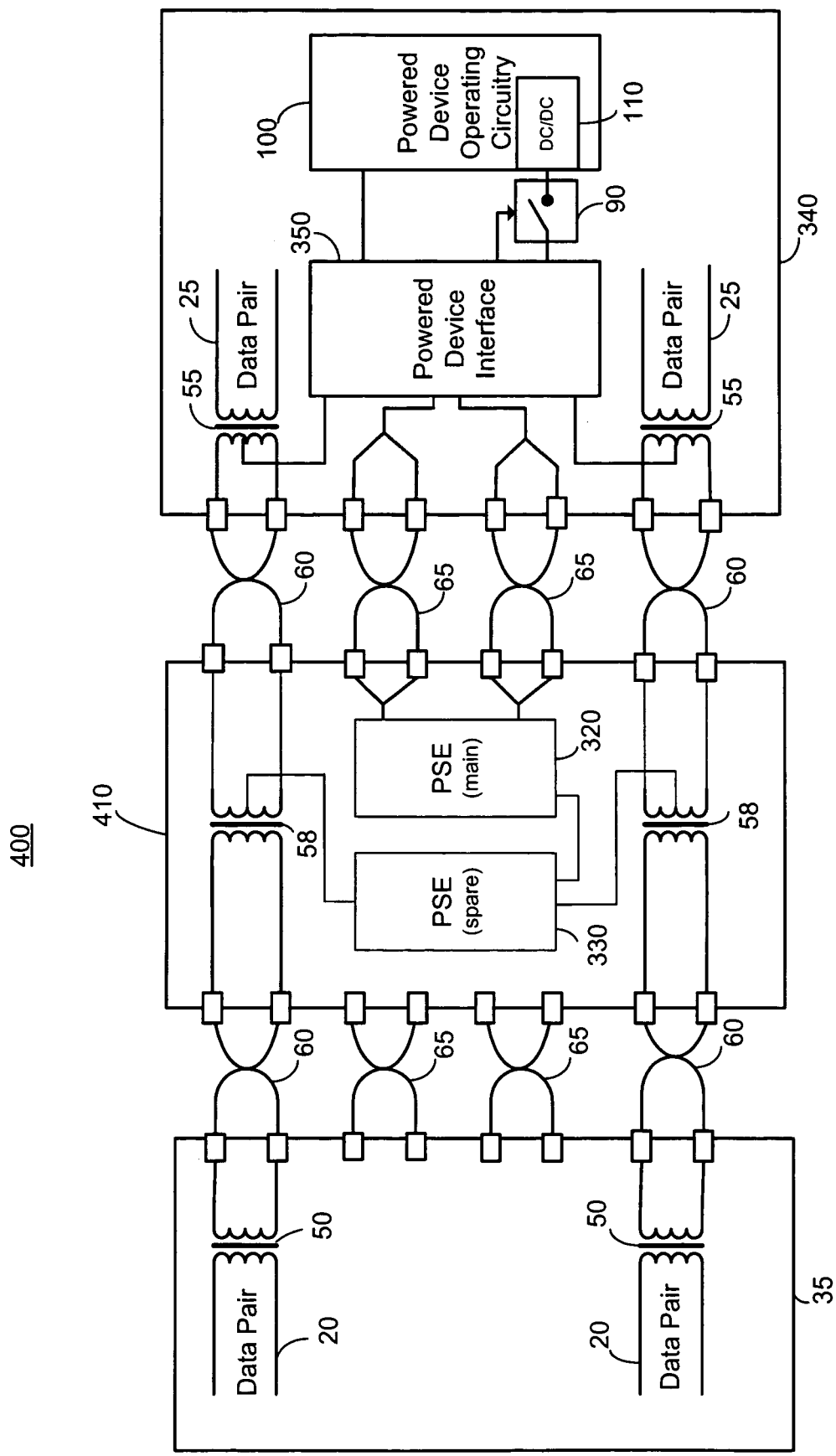
FIG. 2b illustrates a high level block diagram of an embodiment of redundant midspan based PD powering according to the principle of the current invention.

FIG. 2b illustrates a high level block diagram of an embodiment of redundant midspan based PD powering configuration 400 according to the principle of the current invention. Network configuration 400 comprises: a switch/hub equipment 35 comprising a first and second data pair 20; a midspan redundant power insertion equipment 410 comprising a main PSE 320, a spare PSE 330, and a first and second transformer 58; a first through fourth twisted pair data connection 60; a first through fourth spare twisted pair connection 65; and a powered end station 340 comprising a first and second transformer 55, a first and second data pair 25, a PD interface 350, a switch 90 and a PD operating circuitry 100. PD operating circuitry 100 preferably comprises a DC/DC converter 110.

The primary of each of first and second transformers 50 carry respective data pairs 20. The output leads of the secondary of first and second transformers 50 are respectively connected to a first end of first and second twisted pair data connections 60. The second end of first and second twisted pair data connections 60, are respectively connected to the primary of first and second transformers 58 located within midspan power insertion equipment 410. First and second spare twisted pair connections 65 are shown connected between switch/hub 35 and midspan power insertion equipment 410, however no internal connection to either first or second spare twisted pair connection 65 is made.

An output of main PSE 320 is connected to both leads of one end of third spare twisted pair connection 65 and a return of main PSE 320 is connected to both leads of one end of fourth spare twisted pair connection 65. The second end of both leads of both third and fourth spare twisted pair connections 65, are connected to respective power inputs of PD interface 350. An output of spare PSE 330 is connected to the center tap of the secondary of first transformer 58, and a return is connected to the center tap of the secondary of second transformer 58. An optional data connection is provided between main PSE 320 and spare PSE 330.

The output leads of the secondary of first and second transformers 58 are connected to a first end of third and fourth twisted pair data connections 60, respectively. The second end of third and fourth twisted pair data connections 60, are respectively connected to the primary of first and second transformers 55 located within powered end station 340. The center tap of the primary of each of first and second transformers 55 is connected to a respective input of PD interface 350. An output of PD interface 350 is connected to PD operating circuitry 100. The return of PD interface 350 is connected to PD operating circuitry 100 through switch 90 at the input to DC/DC converter 110. Switch 90 is operable by PD interface 350. The secondary of each of first and second transformers 55 carry respective data pairs 25.

In operation, main PSE 320 supplies power over third and fourth spare twisted pair connection 65 to PD interface 350. Data is supplied over the combination of first and second twisted pair data connections 60, first and second transformers 58, and third and fourth twisted pair data connections 60. Spare PSE 330 is connected so as to supply redundant power as required over third and fourth twisted pair data connections 60. PD interface 350 enables detection and classification in accordance with the relevant standard, preferably IEEE 802.3af. In one embodiment PD interface 350 enables detection and classification by each of main PSE 320 and spare PSE 330 as will be explained further hereinto below. In one embodiment, PD interface 350 maintains a valid MPS to spare PSE 330 thus ensuring available power in the event of a failure of main PSE 320. In another embodiment, no valid MPS is supplied, and spare PSE 330 receives data or commands from main PSE 320 to maintain power in a standby powering mode without regard to a valid MPS thus ensuring power availability in the event of a failure of main PSE 320. Preferably and advantageously the standby powering mode, or standby mode, exhibits an active power output. No additional subsequent detection phase is required for spare PSE 330 to supply power in the event of a failure of main PSE 320 to supply power.

Once power is supplied by main PSE 320 to PD interface 350, PD interface 350 operates switch 90 to enable operation of PD operating circuitry 100. DC/DC converter 110 is illustrated at the input to PD operating circuitry 100, however this is not meant to be limiting in any way. DC/DC converter 110 may be located externally of PD operating circuitry 100, within PD interface 350 or may not be present. In an exemplary embodiment, switch 90 comprises an n-channel FET.

Network configuration 400 has been illustrated with main PSE 320 being connected to supply data and power over third and fourth spare twisted pair data connections 65, with redundant power from spare PSE 330 supplied over third and fourth twisted pair data connections 60, however this is not meant to be limiting in any way. Main power from main PSE 320 may be supplied over third and fourth twisted pair data connections 60 with redundant power from spare PSE 330 being supplied over third and fourth spare twisted pair data connections 65 without exceeding the scope of the invention. Power may be supplied simultaneously over both third and fourth twisted pair data connections 60 and third and fourth spare twisted pair connections 65 thus allowing for load sharing between main PSE 320 and spare PSE 330. Main PSE 320 and spare PSE 330 may be separate outputs of a single combined PSE, or may represent separate isolated redundant sources. Main PSE 320 and spare PSE 330 may optionally be enclosed in a single chassis, supplied in different chassis in a single rack, or supplied in separate racks from separate power sources (not shown) without exceeding the scope of the invention.

Optional data communication between main PSE 320 and spare PSE 330 may be accomplished by a current sensor, voltage sensor or data communication. In an exemplary embodiment a single controller or host (not shown) determines the operation of main PSE 320 and spare PSE 330. In another embodiment a plurality of redundant controllers control the operation of main PSE 320 and spare PSE 330. The optional data communication thus provides, without limitation, a means for determining which of the PSEs is to be main PSE 320 and which is to be spare PSE 330. The optional data communication further provides, without limitation, synchronization of operation, timing coordination, and optimization of main PSE 320 and spare PSE 330. Furthermore, optional data communication provides a means for load sharing between main PSE 320 and spare PSE 330, as well as sharing and or comparing detection and classification information as will be described further hereinto below.

Figure 2C:
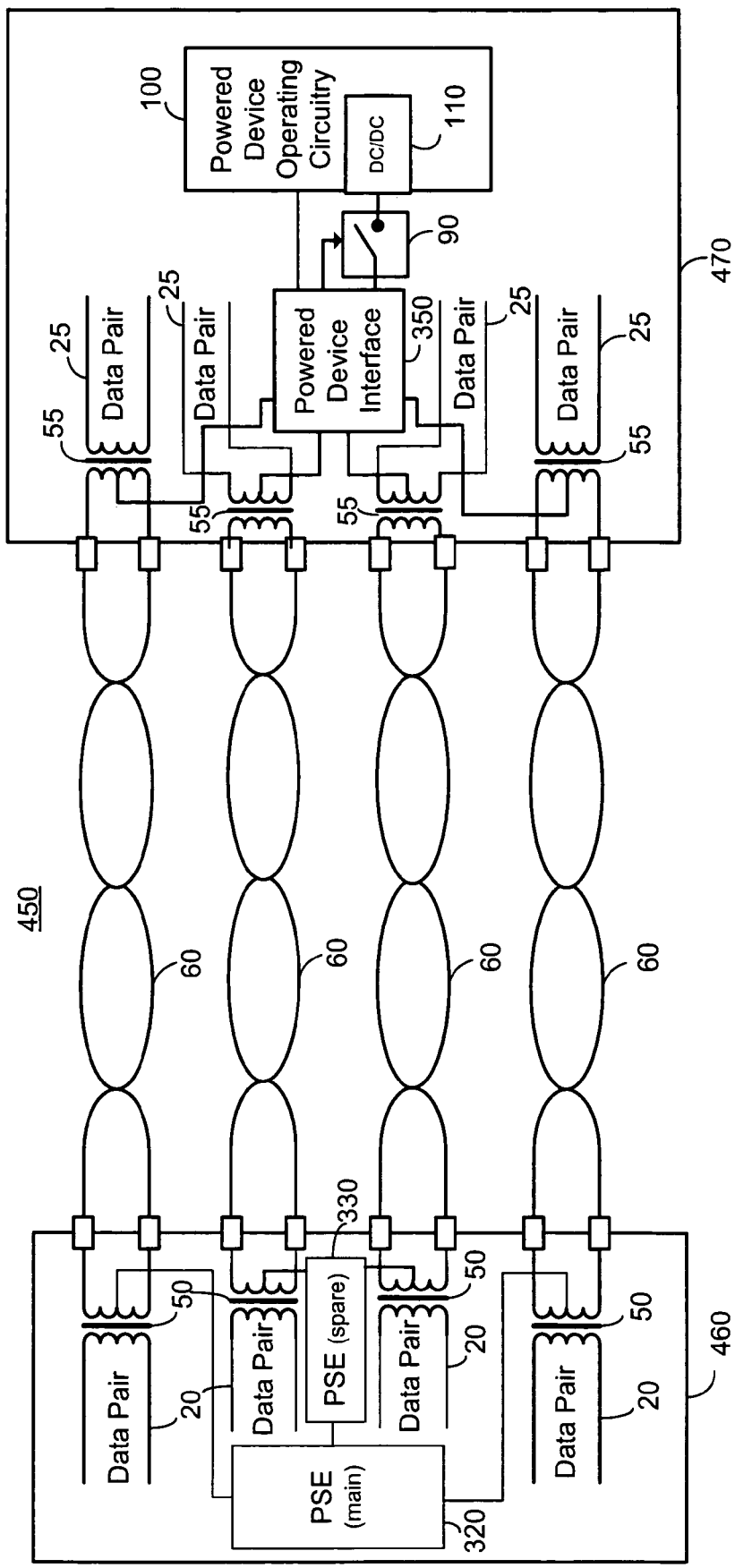
FIG. 2c illustrates a high level block diagram of an embodiment of redundant endpoint based PD powering in a gigabit Ethernet environment according to the principle of the current invention.

FIG. 2c illustrates a high level block diagram of an embodiment of redundant endpoint based PD powering configuration 450, illustrated in a gigabit Ethernet environment, according to the principle of the current invention. Configuration 450 comprises: a switch/hub equipment 460 comprising a first through fourth data pair 20, a main PSE 320, a spare PSE 330, and a first through fourth transformer 50; a first through fourth twisted pair data connection 60; and a powered end station 470 comprising a first through fourth transformer 55, a first through fourth data pair 25, a PD interface 350, a switch 90 and a PD operating circuitry 100. PD operating circuitry 100 preferably comprises a DC/DC converter 110.

The primary of each of first through fourth transformers 50 carry respective data pairs 20. An output and return of main PSE 320 are connected, respectively, to the center tap of the secondary of first and second transformers 50. An output and return of spare PSE 330 are connected, respectively, to the center tap of the secondary of third and fourth transformers 50. An optional data connection is provided between main PSE 320 and spare PSE 330.

The output leads of the secondary of first and second transformers 50 are each connected to a respective first end of first and second twisted pair data connections 60. The second end of first and second twisted pair data connections 60, are respectively connected to the primary of first and second transformers 55 located within powered end station 470. The center tap of the primary of each of first and second transformers 55 is connected to a respective input of PD interface 350.

The output leads of the secondary of third and fourth transformers 50 are each connected to a respective first end of third and fourth twisted pair data connections 60. The second end of third and fourth twisted pair data connections 60, are respectively connected to the primary of third and fourth transformers 55 located within powered end station 470. The center tap of the primary of each of third and fourth transformers 55 is connected to a respective input of PD interface 350.

An output of PD interface 350 is connected to PD operating circuitry 100. The return of PD interface 350 is connected to PD operating circuitry 100 through switch 90 at the input to DC/DC converter 110. Switch 90 is operable by PD interface 350. The secondary of each of first through fourth transformers 55 carry respective data pairs 25.

In operation, main PSE 320 supplies power over first and second twisted pair data connection 60, thus supplying both power and data over first and second twisted pair data connections 60 to PD interface 350. Spare PSE 330 is connected to supply redundant power as required over third and fourth twisted pair data connection 60, thus supplying both redundant power and data over third and fourth twisted pair data connections 60 to PD interface 350. PD interface 350 enables detection and classification in accordance with the relevant standard, preferably IEEE 802.3af. In one embodiment PD interface 350 enables detection and classification by each of main PSE 320 and endpoint spare PSE 320 as will be explained further hereinto below. In one embodiment, PD interface 350 maintains a valid MPS to spare PSE 330 thus ensuring available power in the event of a failure of main PSE 320. In another embodiment, no valid MPS is supplied, and spare PSE 330 receives data or commands from main PSE 320 via the optional data connection, or from a controller or host (not shown) to maintain power in a standby powering mode without regard to a valid MPS thus ensuring power availability in the event of a failure of main PSE 320. Preferably and advantageously the standby powering mode, or standby mode, exhibits an active power output. No additional subsequent detection phase is required for spare PSE 330 to supply power in the event of a failure of main PSE 320 to supply power.

Once power is supplied by main PSE 320 to PD interface 350, PD interface 350 operates switch 90 to enable operation of PD operating circuitry 100. DC/DC converter 110 is illustrated at the input to PD operating circuitry 100, however this is not meant to be limiting in any way. DC/DC converter 110 may be located externally of PD operating circuitry 100, within PD interface 350 or may not be present. In an exemplary embodiment, switch 90 comprises an n-channel FET.

Network configuration 450 has been illustrated with main PSE 320 being connected to supply data and power over first and second twisted pair data connections 60, with redundant power supplied over third and fourth twisted pair data connections 60, however this is not meant to be limiting in any way. Power may be supplied over both first and second twisted pair data connections 60 and third and fourth twisted pair data connections 60 simultaneously, thus allowing for load sharing between main PSE 320 and spare PSE 330. Main PSE 320 and spare PSE 330 may be separate outputs of a single combined PSE, or may represent separate isolated redundant sources. Main PSE 320 and spare PSE 330 may optionally be enclosed in a single chassis, supplied in different chassis in a single rack, or supplied in separate racks from separate power sources (not shown) without exceeding the scope of the invention.

Optional data communication between main PSE 320 and spare PSE 330 may be accomplished by a current sensor, voltage sensor or data communication. In an exemplary embodiment a single controller (not shown) determines the operation of main PSE 320 and spare PSE 330. In another embodiment a plurality of redundant controllers control the operation of main PSE 320 and spare PSE 330. The optional data communication thus provides, without limitation, a means for determining which of the PSEs is to be main PSE 320 and which is to be spare PSE 330. The optional data communication further provides, without limitation, synchronization of operation, timing coordination, and optimization of main PSE 320 and spare PSE 330. Furthermore, optional data communication provides a means for load sharing between main PSE 320 and spare PSE 330, as well as sharing and or comparing detection and classification information as will be described further hereinto below.

Figure 3A:
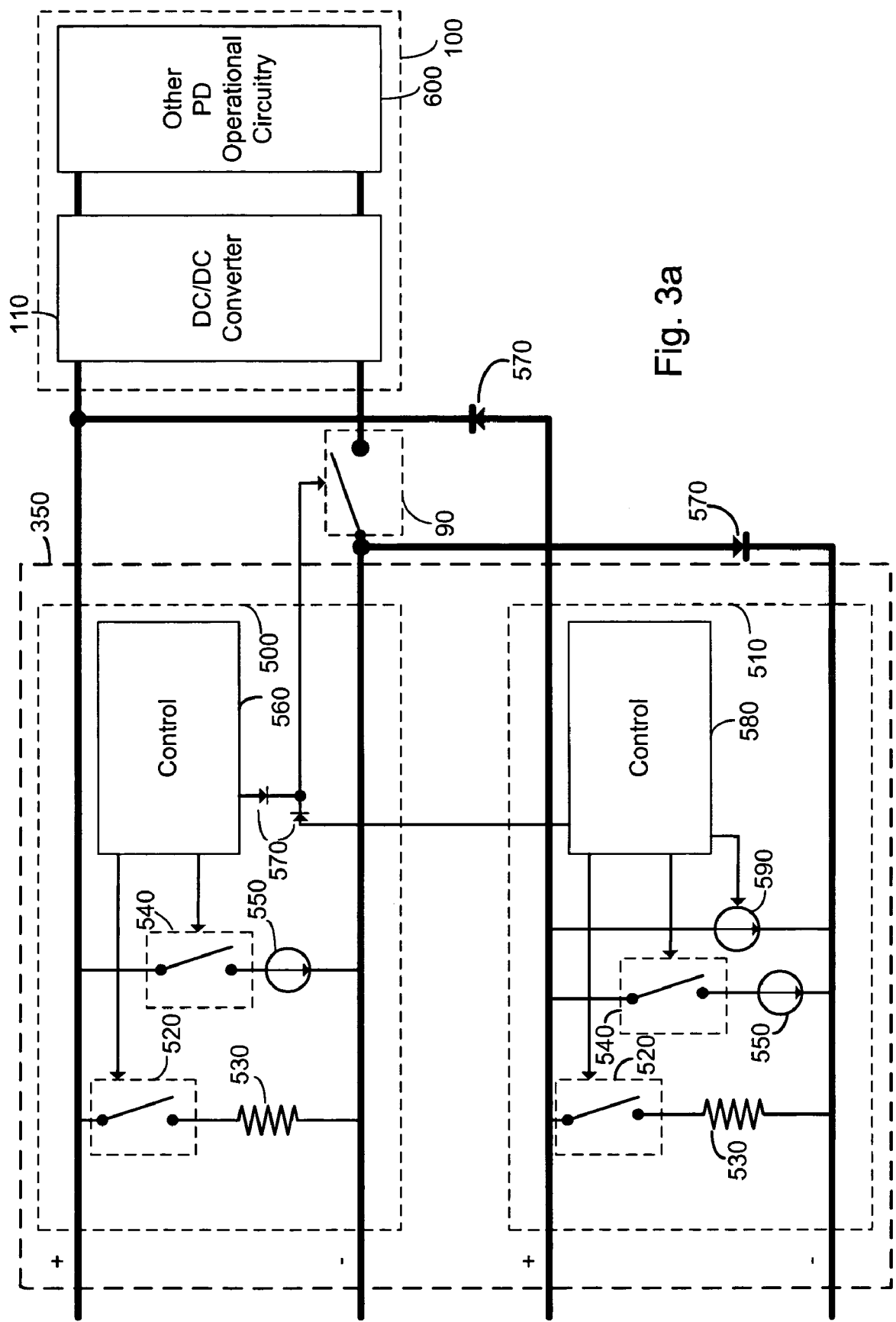
FIG. 3a illustrates a high level block diagram of an embodiment of a PD having a pre-determined main powering path according to the principle of the invention.

FIG. 3a illustrates a high level block diagram of an embodiment of a powered end station comprising PD interface 350 having a predetermined main power path 500 and redundant power path 510; a switch 90; and a PD operating circuitry 100, according to the principle of the invention. Main power path 500 comprises a switch 520 and a switch 540, a signature impedance 530, a classification current source 550, a control 560 and a plurality of diodes 570. Redundant power path 510 comprises a switch 520 and a switch 540, a signature impedance 530, a classification current source 550, an MPS maintainer 590 and a control 580. PD operating circuitry 100 comprises a DC/DC converter 10 and an other PD operational circuitry 600.

Power paths 500 and 510 are illustrated with positive and negative input leads shown; polarity is typically ensured through the use of a diode bridge (not shown). Power paths 500 and 510 are respectively connected to twisted pair inputs as described above in relation to FIGS. 2a-2c, with main power path 500 being operatively connected to main PSE 320 and redundant power path 510 being operatively connected to spare PSE 330. Switches 520 are connected to operatively switch signature impedance 530 respectively across power paths 500, 510. Switches 540 are connected to operatively switch classification current sources 550 respectively across power paths 500, 510. Switches 520 and 540 of main power path 500 are connected to respective outputs of control 560, and switches 520 and 540 of redundant power path 510 are connected to respective outputs of control 580.

MPS maintainer 590 is connected across power path 510 and is operatively connected to an output of control 580. In an exemplary embodiment MPS maintainer 590 comprises a 10 mA current source, or load capable of drawing 10 mA when input voltage meets or exceeds $V_{on}$. An output of control 580 is connected in a diode "or" arrangement with an output of control 560 to the control input of switch 90 via diodes 570. The positive lead of redundant power path 510 is connected with a diode "or" arrangement via a diode 570 with the positive lead of main power path 500, and the positive lead of main power path 500 is connected to the positive input of DC/DC converter 110. The negative lead of redundant power path 510 is connected in a diode "or" arrangement via a diode 570 with the negative lead of main power path 500, and the negative lead of main power path 500 is connected to a first side of switch 90. A second side of switch 90 is connected to the return lead of DC/DC converter 110. The output of DC/DC converter 110 is fed to other PD operational circuitry 600.

In operation, main power path 500 exhibits a signature resistance, and optionally a classification current, to main PSE 320. Redundant power path 510 exhibits a signature resistance, and optionally a classification current, to spare PSE 330. The classification current of power path 500 and 510 presented via classification current sources 550 need not be the same. In an exemplary embodiment a combination of unequal classifications notifies the combination of main PSE 320 and spare PSE 330 of the powering requirements. Control 580 operates current source 590 to exhibit a valid MPS to spare PSE 330 thus ensuring power on of spare PSE 330 while main PSE 320 is operating. It is to be understood that a valid MPS does not require full time operation of MPS maintainer 590, and power losses may be limited by toggling MPS maintainer 590 so as to maintain a valid MPS in accordance with the above reference standard. In the event of a failure of main PSE 320, power will be drawn from spare PSE 330 and switch 90 will be operated through diode 570 by control 580. Control 580 will preferably disable current source 590 in the event of power being drawn from spare PSE 330.

Figure 3B:
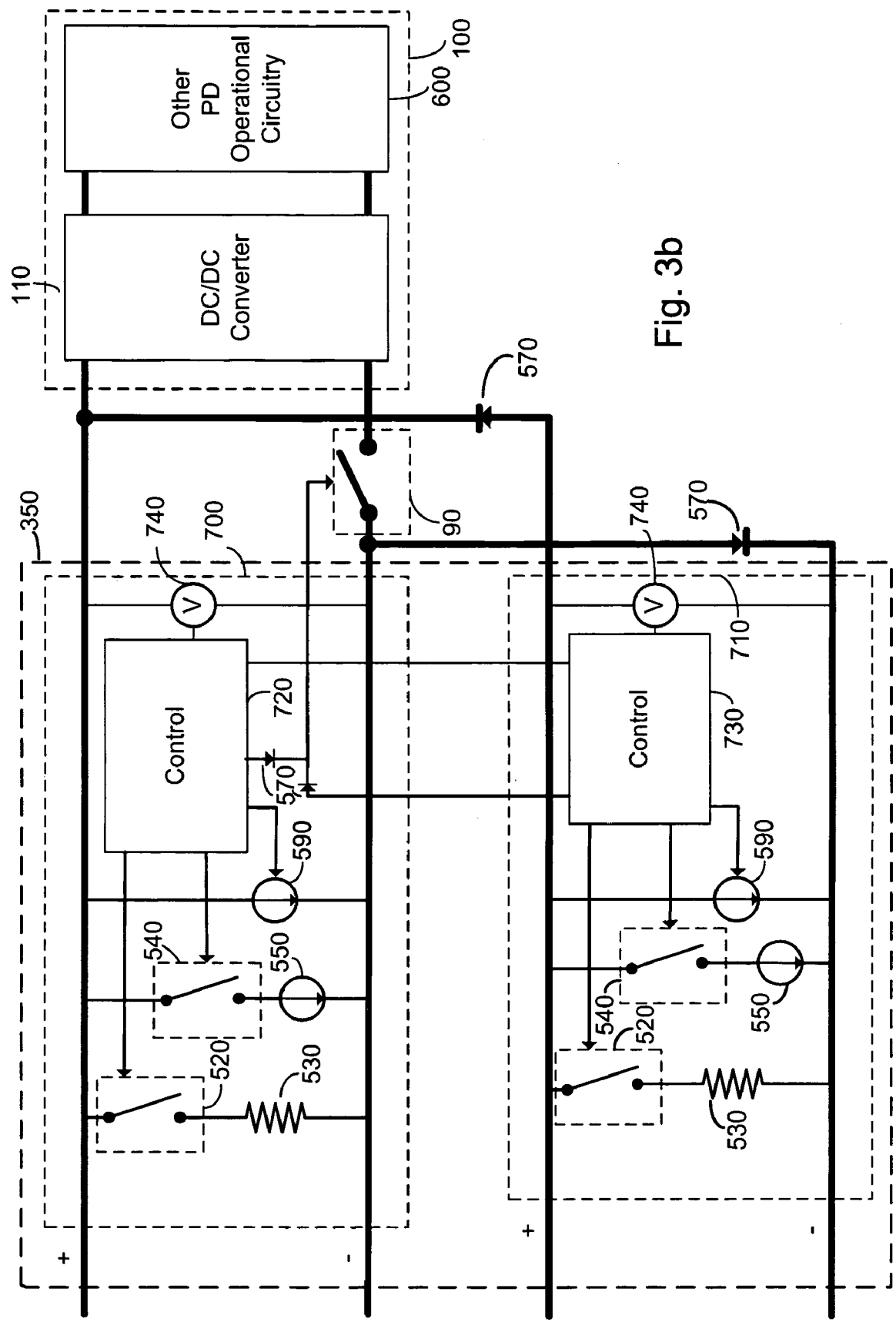
FIG. 3b illustrates a high level block diagram of an embodiment of a PD having two powering paths, each of which may function as a main powering path, according to the principle of the invention.

FIG. 3b illustrates a high level block diagram of an embodiment of a powered end station comprising PD interface 350 having two powering paths, each of which may function as a main powering path, according to the principle of the invention. The powered end station of FIG. 3b comprises a PD interface 350 having a plurality of power paths designated 700 and 710; a switch 90; and a PD operating circuitry 100. Power path 700 comprises a switch 520 and a switch 540, a signature impedance 530, a classification current source 550, a control 720, an MPS maintainer 590, a voltage sensor 740 and a plurality of diodes 570. Power path 710 comprises a switch 520 and a switch 540, a signature impedance 530, a classification current source 550, an MPS maintainer 590, a voltage sensor 740 and a control 730. PD operating circuitry 100 comprises a DC/DC converter 110 and an other PD operational circuitry 600.

Power paths 700 and 710 are illustrated with positive and negative input leads shown; polarity is typically ensured through the use of a diode bridge (not shown). Power paths 700 and 710 are respectively connected to twisted pair inputs as described above in relation to FIGS. 2a-2c, with power path 700 being operatively connected to a first one of main PSE 320 and spare PSE 330 and power path 710 being operatively connected to a second one of main PSE 320 and spare PSE 330. Switches 520 are connected to operatively switch signature impedances 530 respectively across power paths 700, 710. Switches 540 are connected to operatively switch respective classification current sources 550 across power paths 700, 710. Switches 520 and 540 of power path 700 are connected to respective outputs of control 720, and switches 520 and 540 of power path 510 are connected to respective outputs of control 730.

An MPS maintainer 590 is connected across power path 700 and is operatively connected to an output of control 720. An MPS maintainer 590 is connected across power path 710 and is operatively connected to an output of control 730. In an exemplary embodiment MPS maintainer 590 comprises a 10 mA current source, or load capable of drawing 10 mA when input voltage meets or exceeds $V_{on}$. An output of control 720 is connected in a diode "or" arrangement with an output of control 730 to the control input of switch 90 via diodes 570. Control 720 and 730 are connected to receive an indication of a voltage level from respective voltage sensors 740. Control 720 and 730 are connected by a data communication path. The positive lead of power path 710 is connected in a diode "or" arrangement via diode 570 with the positive lead of power path 700, and the positive lead of power path 700 is connected to the positive input of DC/DC converter 110. The negative lead of power path 710 is connected in a diode "or" arrangement via diode 570 with the negative lead of power path 700, and the negative lead of power path 700 is connected to a first side of switch 90. A second side of switch 90 is connected to the return lead of DC/DC converter 110. The output of DC/DC converter 110 is fed to other PD operational circuitry 600.

In operation power path 700 exhibits a signature resistance, and optionally a classification current, to a first one of main PSE 320 and spare PSE 330. Power path 710 exhibits a signature resistance, and optionally a classification current, to a second one of main PSE 320 and spare PSE 330. The classification current of power paths 700 and 710 presented via classification current sources 550 need not be the same. In an exemplary embodiment a combination of unequal classifications notifies the combination of main PSE 320 and spare PSE 330 of the powering requirements. Control 720 and 730 communicate data regarding the voltage levels sensed by their associated voltage sensors 740 to determine which of power paths 700 and 710 are to be the main power path and which is to be the spare power path. It is to be understood that in the configuration shown, the main power path is the path with the higher voltage, taking into account any losses associated with sharing diodes 570. This is not meant to be limiting in any way, and other configurations enabling power sharing between the two paths, or a pre-selected master may be utilized without exceeding the scope of the invention. The controller associated with the determined spare path operates its associated MPS maintainer 590 to exhibit a valid MPS thus ensuring power on of spare PSE 330 while main PSE 320 is operating. It is to be understood that a valid MPS does not require full time operation of MPS maintainer 590, and power losses may be limited by toggling MPS maintainer 590 so as to maintain a valid MPS in accordance with the above referenced standard. In the event of a failure of main PSE 320, power will be drawn from spare PSE 330. Switch 90 will be operated by control 720 or 730 associated with the determined operating power path. Preferably, power for control 720 and 730 is derived from a separate diode "or" path to ensure continued powering.

Figure 3C:
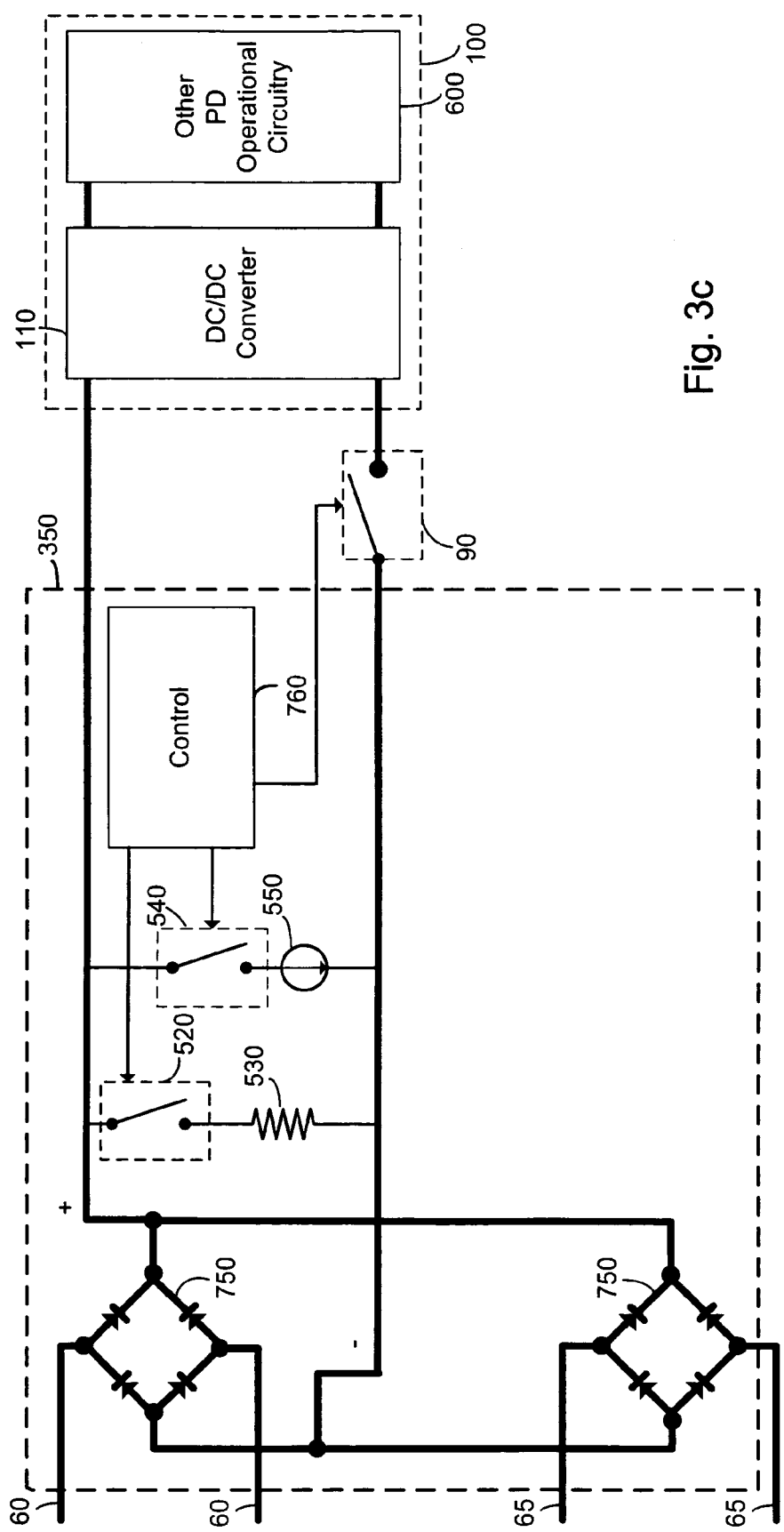
FIG. 3c illustrates a high level block diagram of an embodiment of a PD having two powering paths and circuitry enabling powering from either of the paths according to the principle of the invention.

FIG. 3c illustrates a high level block diagram of an embodiment of a powered end station comprising PD interface 350 having two powering paths and a circuit enabling powering from either of the paths according to the principle of the invention. The powered end station of FIG. 3c comprises a PD interface 350 connected to a first powering path comprising a first and second twisted pair data connection 60 and a second powering path comprising a first and second spare twisted pair connection 65; a switch 90; and a PD operating circuitry 100. PD interface 350 comprises: a first and second diode bridge 750; a switch 520 and a switch 540; a signature impedance 530; a classification current source 550; and a control 760. PD operating circuitry 100 comprises a DC/DC converter 110 and an other PD operational circuitry 600.

First diode bridge 750 is connected to first powering path comprising first and second twisted pair data connections 60 so as to provide a predetermined positive and negative output irrespective of the polarity of the PSE supplying power. Second diode bridge 750 is connected to second powering path comprising first and second spare twisted pair connections 65 so as to provide a predetermined positive and negative output irrespective of the polarity of the PSE supplying power. The positive output of first diode bridge 750 is connected to the positive output of second diode bridge 750. The negative output of first diode bridge 750 is connected to the negative output of second diode bridge 750. Switch 520 is arranged to operatively switch signature impedance 530 across the output of first and second diode bridges 750. Switch 540 is arranged to operatively switch classification current source 550 across the output of first and second diode bridges 750. Switches 520 and 540 are connected to respective outputs of control 760.

An output of control 760 is connected to the control input of switch 90. The positive output of first and second diode bridges 750 are connected to the positive input of DC/DC converter 110. The negative output of first and second diode bridges 750 are connected to a first side of switch 90. A second side of switch 90 is connected to the return lead of DC/DC converter 110. The output of DC/DC converter 110 is fed to other PD operational circuitry 600.

In operation PD interface 350 exhibits a signature resistance by operating switch 520, and optionally a classification current by operating switch 540, to a main PSE 320 and/or a spare PSE 320, as will be explained further hereinto below. Power is supplied from main PSE 320 via first and second twisted pair data connections 60. Redundant power is provided from spare PSE 330 via first and second spare twisted pair connections 65. In an exemplary embodiment the output voltage of spare PSE 330 is set to be lower than the output voltage of main PSE 320 thus ensuring that power is drawn from main PSE 320. This is not meant to be limiting in any way, and other configurations enabling power sharing between the two paths may be utilized without exceeding the scope of the invention.

Figure 4A:
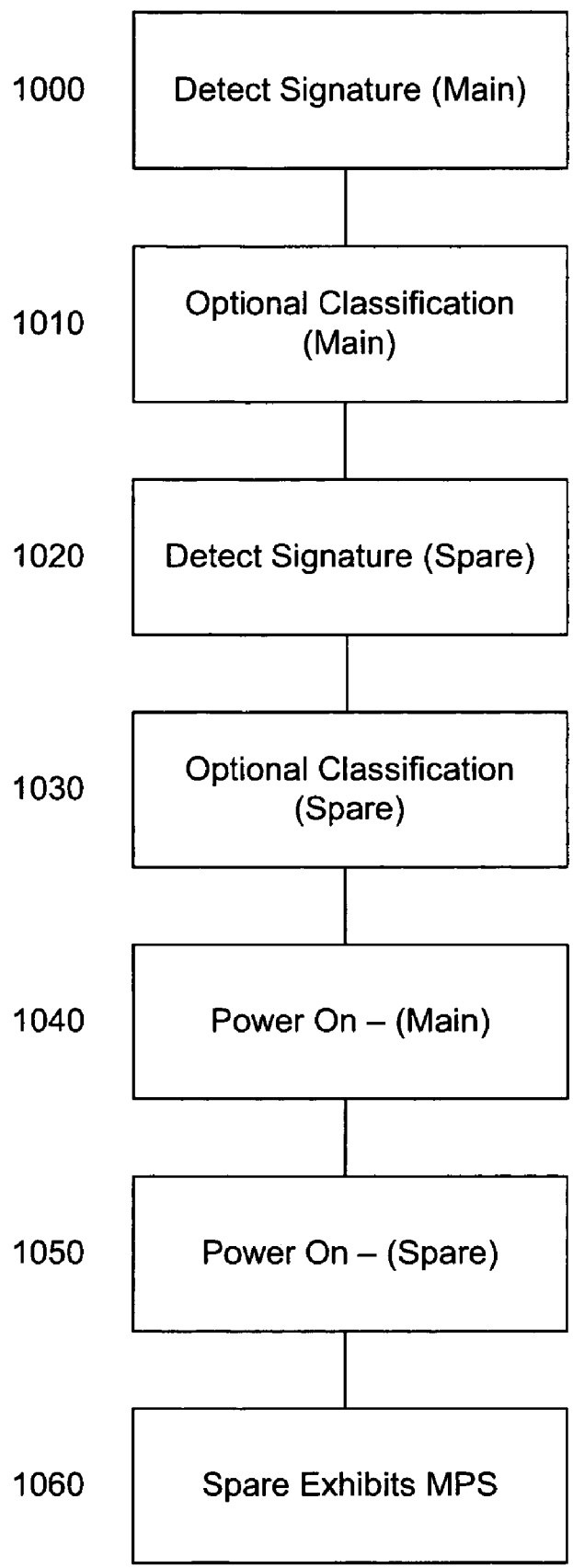
FIG. 4a illustrates a high level flow chart of the operation of the network configuration of any of FIGS. 2a-2c to redundantly power the PD of any of FIG. 3a or 3b according to the principle of the invention.

FIG. 4a illustrates a high level flow chart of the operation of any of the network configurations of FIGS. 2a-2c to redundantly power according to the principle of the invention any of the powered end station of FIG. 3a or 3b. In stage 1000 main PSE 320 detects a valid detection signature impedance. In optional stage 1010 main PSE 320 detects a valid classification current. In stage 1020 spare PSE 330 detects a valid detection signature impedance. In optional stage 1030 spare PSE 330 detects a valid classification current. There is no requirement that the classification current detected by main PSE 320 and spare PSE 330 be the same. The use of two classification currents of different values allows an increased number of values. Based on the initial 5 classification values of the aforementioned standard, a total of 25 states may be communication by the combination of two classifications.

In stage 1040 main PSE 320 enables power and voltage exceeds $V_{on}$. In stage 1050 spare PSE 330 enables power preferably at a lower voltage than that of main PSE 320. In stage 1060 pre-determined spare power path 510 of FIG. 3a and the determined spare path of FIG. 3b exhibit a valid MPS. Thus power is supplied by main PSE 320 and a spare power path, having completed detection and optional classification, is maintained by spare PSE 330.

Figure 4B:
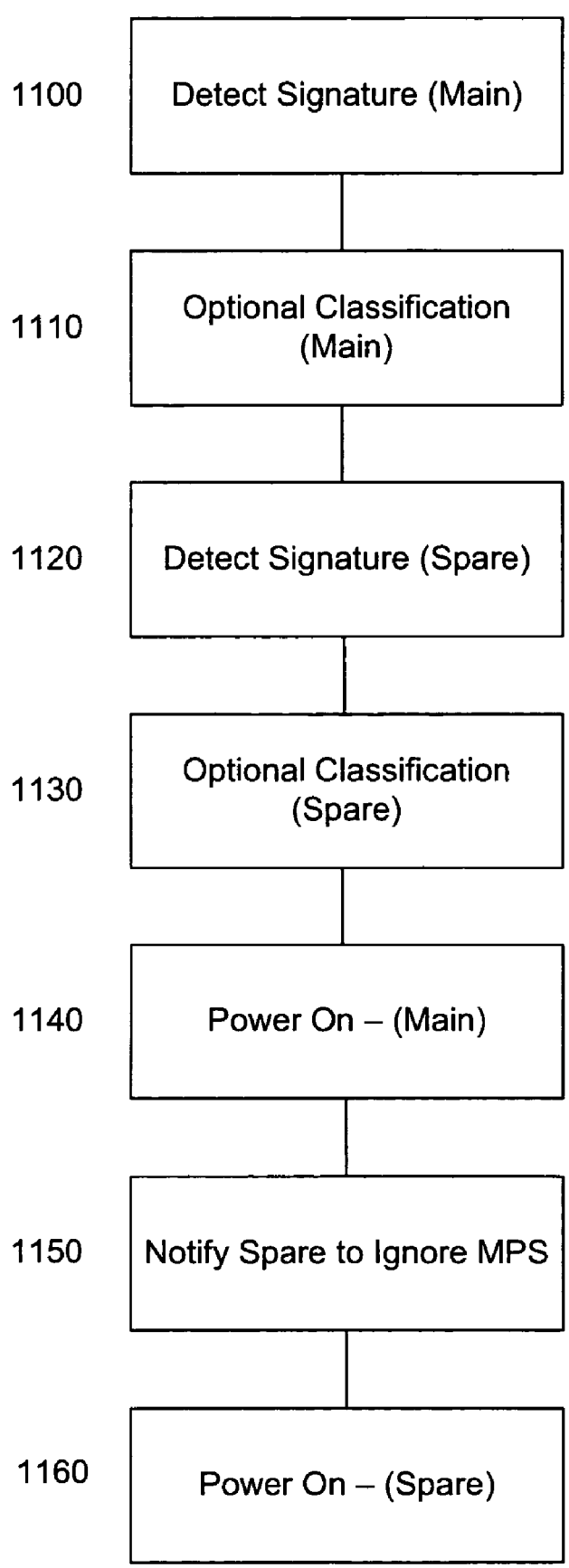
FIG. 4b illustrates a high level flow chart of the operation of the network configuration of any of FIGS. 2a-2c to redundantly power the PD of any of FIGS. 3a-3c according to the principle of the invention in which no valid MPS is required for the redundant PSE.

FIG. 4b illustrates a high level flow chart of the operation of the network configuration of FIGS. 2a-2c to redundantly power, according to the principle of the invention, the PD of any of FIGS. 3a-3c, in which PSE 320 communicates with PSE 330 and no valid MPS is required in order to maintain redundant powering. In stage 1100 main PSE 320 detects a valid detection signature impedance. In optional stage 1110 main PSE 320 detects a valid classification current. In stage 1120 spare PSE 330 detects a valid detection signature impedance. In optional stage 1130 spare PSE 330 detects a valid classification current. There is no requirement that the classification current detected by main PSE 320 and spare PSE 330 be the same. The use of two classification currents of different values allows for an increased number of values. Based on the initial 5 classification values of the aforementioned standard, a total of 25 states may be communication by the combination of two classifications. In stage 1140 main PSE 320 enables power and voltage exceeds $V_{on}$. In stage 1150 spare PSE 330 is notified to ignore a lack of MPS. Preferably this notification is from one of a system controller, host, or via the optional communication channel form the control of main PSE 320. In stage 1160 spare PSE 330 enables redundant power in a standby, or backup, mode.

Figure 4C:
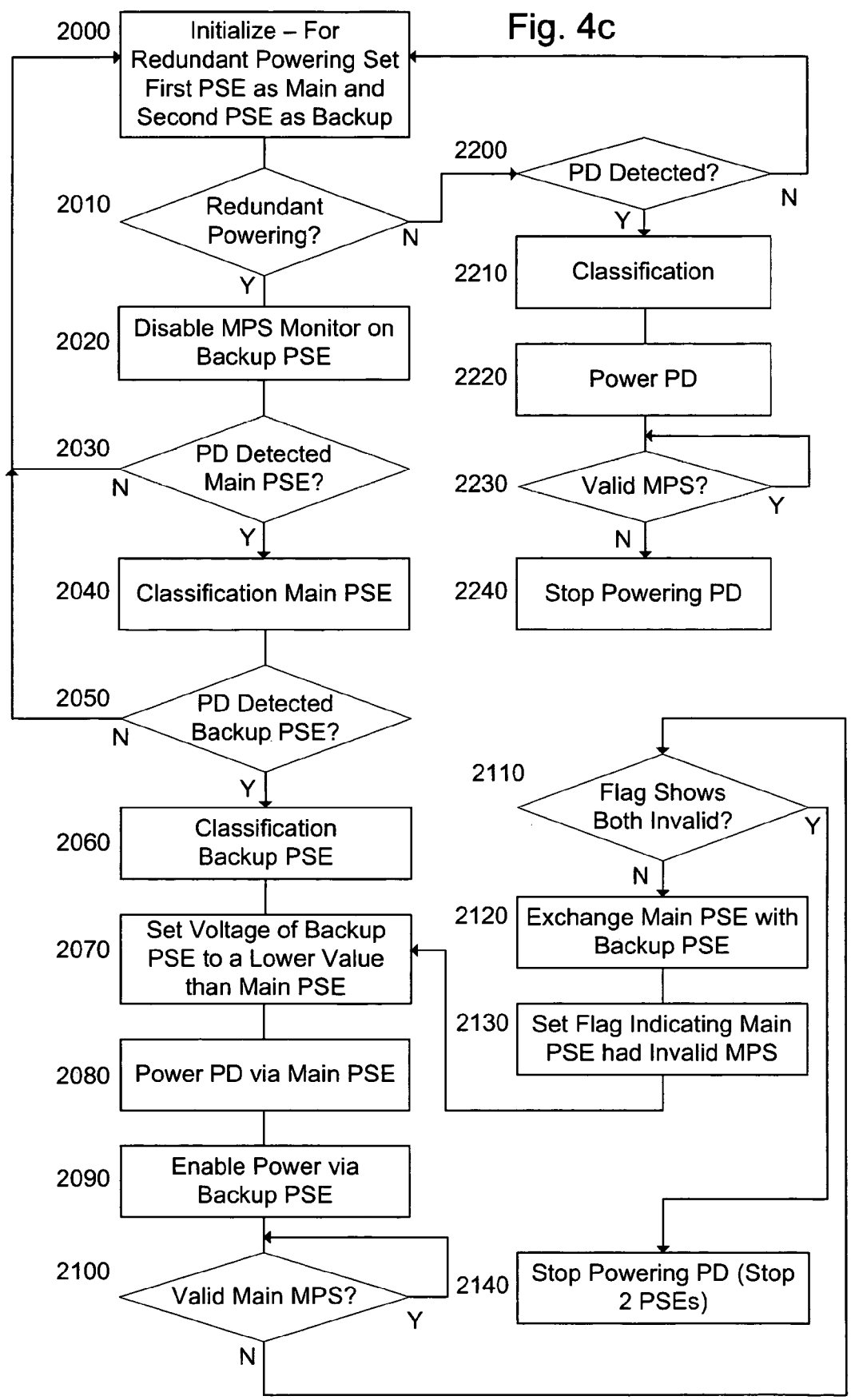
FIG. 4c illustrates a high level flow chart of the operation of the network configuration of any of FIGS. 2a-2c to provide redundant powering according to the principle of the invention for the PD of FIG. 3c, further illustrating the operation in the event of a failure of the main PSE.

FIG. 4c illustrates a high level flow chart of the operation of the network configuration of FIGS. 2a-2c to provide redundant powering for the PD of FIG. 3c in accordance with the principle of the current invention further illustrating the operation in the event of a failure of main PSE 320. In stage 2000 the system is initialized, including inputting from a host computer (not shown) or from another source an initial identification of main PSE 320 and an associated spare PSE 330. In a preferred embodiment main PSE 320 and spare PSE 330 are constituted identically, thus the host computer or other source may select either of them to act as main PSE 320 and the other to act as spare PSE 330. Preferably spare PSE 330 is physically separate from main PSE 320, and even further preferably spare PSE 330 is located in a separate chassis or rack from main PSE 320. All flags are cleared.

In stage 2010 the mode of operation input in stage 2000 is checked to see if main PSE 320 is part of a redundant powering operation. In the event that in stage 2010 it is determined that main PSE 320 is associated with a redundant powering operation, in stage 2020 the MPS monitoring functionality of spare PSE 330 is preferably disabled. In stage 2030 detection by main PSE 320 is enabled. In the event that in stage 2030 a PD is detected by main PSE 320, in stage 2040 classification by main PSE 320 is enabled. It is to be understood that classification stage 2040 is optional. In stage 2050 detection by spare PSE 330 is enabled. In the event that in stage 2050 a PD is detected by spare PSE 330, in stage 2060 classification by spare PSE 330 is enabled.

The above is described as having both main PSE 320 and spare PSE 330 both detect and classify an attached PD. This is not meant to be limiting in any way, and in another embodiment only main PSE 320 classifies the attached PD, the classification information being shared by data communication from main PSE 320 to spare PSE 330. In yet another embodiment only main PSE 320 identifies the attached PD, the detection information being shared by data communication from main PSE 320 to spare PSE 330.

In stage 2070 the voltage output of spare PSE 330 is set to a lower value than the voltage output of main PSE 320. Setting spare PSE 330 to a lower value ensures that power for PD 340 of FIGS. 2a, 2b and PD 470 of FIG. 2c will be drawn from main PSE 320 and will only be drawn from spare PSE 330 in the event of a failure of main PSE 320. In stage 2080 main PSE 320 is enabled thereby supplying power to PD 340 of FIGS. 2a, 2b and PD 470 of FIG. 2c in accordance with the voltage setting of stage 2070. In stage 2090 spare PSE 330 is enabled thereby enabling redundant powering from spare PSE 330 in the event of a failure of main PSE 320. Spare PSE 330 is enabled in accordance with the voltage setting of stage 2070. In stage 2100 main PSE 320 monitors a valid MPS. In the event that a valid MPS is detected stage 2100 is repeated.

In the event that in stage 2100 a valid MPS is not detected, in stage 2110 a flag is inspected to determine if both main PSE 320 and spare PSE 330 have detected an invalid MPS. In the event that both main PSE 320 and spare PSE 330 have detected an invalid MPS in stage 2140 both main PSE 320 and spare PSE 330 are disabled.

In the event that in stage 2110 both main PSE 320 and spare PSE 330 have not detected an invalid MPS, in stage 2120 the labels associated with main PSE 320 and spare PSE 330 are exchanged. Thus, main PSE 320 as identified in stage 2000 is now labeled spare PSE 330, and spare PSE 330 as identified in stage 2000 is now labeled main PSE 320. The MPS monitor of main PSE 320, as now labeled, is enabled. The MPS monitor of spare PSE 330, as now labeled, is disabled. In stage 2130 a flag indicating that main PSE 320 has detected an invalid MPS is set. Stage 2070 as described above is then repeated.

In the event that either in stages 2030 or 2050 a valid PD detection signature is not detected, stage 2000 is repeated. Thus, in the event that no valid PD is detected the system continues to identify other PDs requiring powering. In a preferred embodiment the return to stage 2000 from stage 2030 includes a flag indicating that main PSE 320 has failed to detect a valid signature. In a preferred embodiment the return to stage 2000 from stage 2050 includes a flag indicating that spare PSE 330 has failed to detect a valid signature. In an exemplary embodiment a user is informed, and may reconfigure the PSE for non-redundant operation.

In the event that in stage 2010 it is determined that main PSE 320 is not associated with a redundant power operation, in stage 2200 main PSE 320 is enabled to attempt to detect a PD. The PD may be one of PD 340 of FIGS. 2a, 2b and PD 470 of FIG. 2c. In the event that a PD is detected in stage 2210 classification of the detected PD is enabled. It is to be understood that classification in accordance with stage 2210 is optional. In stage 2220, main PSE 320 is enabled to power the PD detected in stage 2200. In stage 2230 an MPS of main PSE 320 is monitored. In the event that a valid MPS is detected, stage 2230 is repeated. In the event that in stage 2230 a valid MPS is not detected, in stage 2240 main PSE 320 stops powering the PD. In the event that in stage 2200 a PD is not detected, stage 2000 is repeated.

Figure 5:
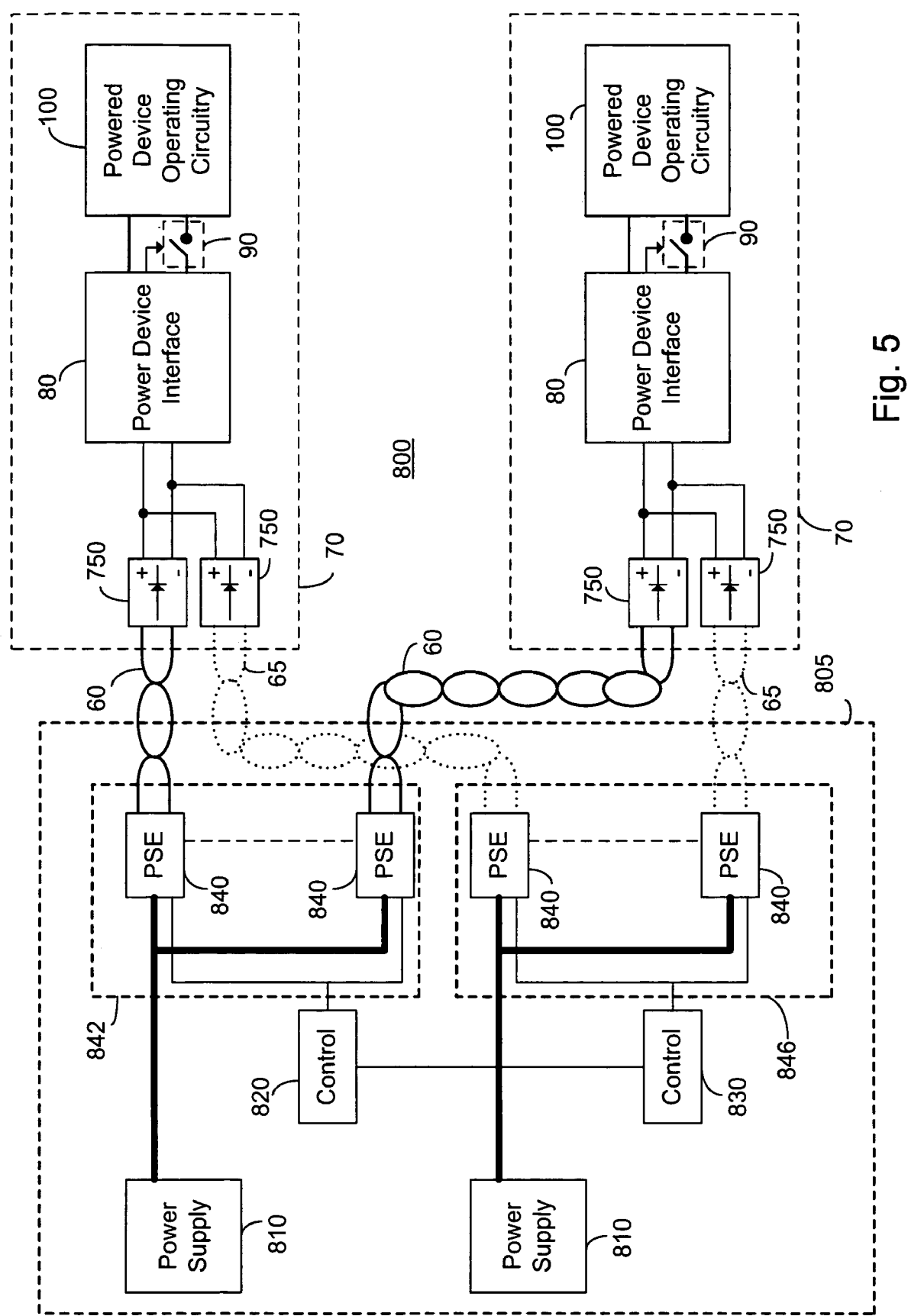
FIG. 5 illustrates a high level block diagram of an embodiment of a system providing redundant power for powered devices according to the principle of the invention, comprising pairs of PSEs providing redundancy.

FIG. 5 illustrates a high level block diagram of an embodiment of a system 800 providing redundant power according to the principle of the current invention while supporting PDs known to the prior art. System 800 is applicable for use with PDs of any of FIGS. 3a-3c, and may advantageously be used with any of configurations 300, 400 and 450 of FIGS. 2a-2c. System 800 comprises a redundant power supply 805, a first and second twisted pair data connection 60, a first and second spare twisted pair connection 65, and a plurality of powered end stations 70 each comprising a first and second diode bridge 750, a PD interface 80, a switch 90 and a PD operating circuitry 100. Powered end stations 70 are illustrated without data connections; however data connections may be as represented in any of FIGS. 2a-2c.

Redundant power supply 805 comprises a first and second power supply 810, a control 820, a control 830 and a plurality of PSEs 840 arranged in a first group 842 associated with control 820 and first power supply 810 and a second group 846 associated with control 830 and second power supply 810. Powered end stations 70 are in all respect identical to those illustrated in FIGS. 1a-1c and 3c, however for clarity transformers 50 and data pairs 20 have not been shown. Diode bridges 750 have been shown to enable an understanding of the operation, and are known in the prior art to be included in powered end station 70 so as to ensure polarity. Redundant power supply 805 may be part of midspan power supply equipment or endpoint power supply equipment. First and second power supply 810 may represent a single power supply, a single power supply with a plurality of outputs, or a plurality of independent power supplies without exceeding the scope of the invention.

First power supply 810 supplies power to the PSEs 840 of group 842 which are controlled by control 820 and second power supply 810 supplies power to the PSEs 840 of group 846 which are controlled by control 830. Each of group 842 and 846 are shown comprising two PSEs 840 however this is not meant to be limiting in any way and is shown by way of illustration only. In a typical embodiment 8, 16, 24, 48 or 96 PSEs 840 are supplied by a single power supply 810. Each PSE 840 of group 842 is connected by twisted pair data connection 60 to a particular powered end station 70. Each PSE 840 of group 846 is connected by spare twisted pair connection 65 to a particular powered end station 70. Twisted pair connection 65 is shown as a dotted line for clarity. In practice, twisted pair data connections 60 and spare twisted pair connections 65 are preferably part of a common structured cable connecting redundant power supply 805, or associated hub equipment, to powered end station 70 and connect through a common connector. In an exemplary embodiment the connector is an RJ-45 connector. It is to be noted that for each powered end station 70 a twisted pair connection 60 and a twisted pair connection 65 is provided. It is further to be noted that in the arrangement of FIG. 2c, representative of a gigabit Ethernet environment, there is no spare connections and spare twisted pair connections 65 is replaced with additional twisted pair data connections 60 without exceeding the scope of the invention.

Twisted pair data connection 60 is connected to an input of first diode bridge 750, and the output of first diode bridge 750 is connected to the input of PD interface 80. Spare twisted pair connection 65 is connected to an input of second diode bridge 750, and the output of second diode bridge 750 is connected to the input of PD interface 80. Thus the output of first and second diode bridges 750 are connected with a wired or arrangement to the input of PD interface 80. The output of PD interface 80 is connected via switch 90 to PD operating circuitry 100.

In operation first power supply 810 supplies power to each PSE 840 of group 842, and each active PSE 840 of first group of PSE 840 supplies power to powered end station 70 over twisted pair connection 60 under control of control 820. Control 820 communicates with control 830 regarding powered end station 70 being powered by a PSE 840 of group 842. Control 830 enables the PSE 840 of group 846 which is connected via twisted pair connection 65 to the same powered end station 70 to act as a backup. Thus, in the event of a failure of first power supply 810, control 820 or PSE 840 of group 842, power is supplied without interruption from PSE 840 of group 846.

In one embodiment detection and optional classification is not accomplished by the standby PSE 840 of group 846. In another embodiment detection and classification is accomplished as described above in FIGS. 4a, 4b or 4c thus accomplishing detection and classification by both PSE 840 of group 842 and PSE 840 of the group 846 prior to powering. Advantageously, detection and classification of identical values by both PSE 840 of group 842 and PSE 840 of group 846 indicates to control 820 and 830 that a PD having a legacy arrangement as shown is to be powered using redundant powering. Alternatively, and additionally, an additional stage of simultaneous detection is accomplished by PSE 840 of group 842 and PSE 840 of group 846 resulting in a value indicative of the arrangement.

Advantageously system 800 of FIG. 5 exhibits two independent powering paths having no single point of failure with the exception of the cabling. Furthermore, system 800 is fully compatible with current PDs. Additionally, system 800 enables load balancing between first and second groups 842 and 846. Thus, some powered end stations 70 will be powered by PSE 840 of group 842, with the associated PSE 840 of group 846 acting as a back-up, while others will be powered by PSE 840 of group 846 with the associated PSE 840 of group 842 acting as a back-up.

System 800 may also be operated to enable load balancing for each PSE 840 in which the load of powered device 70 is shared between PSE 840 of group 842 and PSE 840 of group 846. In an exemplary embodiment, PSE 840 to be used as a main power is operated at a higher voltage than PSE 840 used as a back-up, thus enabling automatic back-up in the event of a failure of main PSE 840. For example, control 830 may operate PSE 840 acting as a back-up at 1 volt less than the voltage of PSE 840 operated by control 820 as a main supply, thus immediate back-up will occur as a result of the wired or connection of powered end device 70. In such an embodiment preferably the PSE 840 acting as a backup or redundant PSE, does not monitor an MPS thus exhibiting an active output and not requiring an additional subsequent detection phase.

Figure 6:
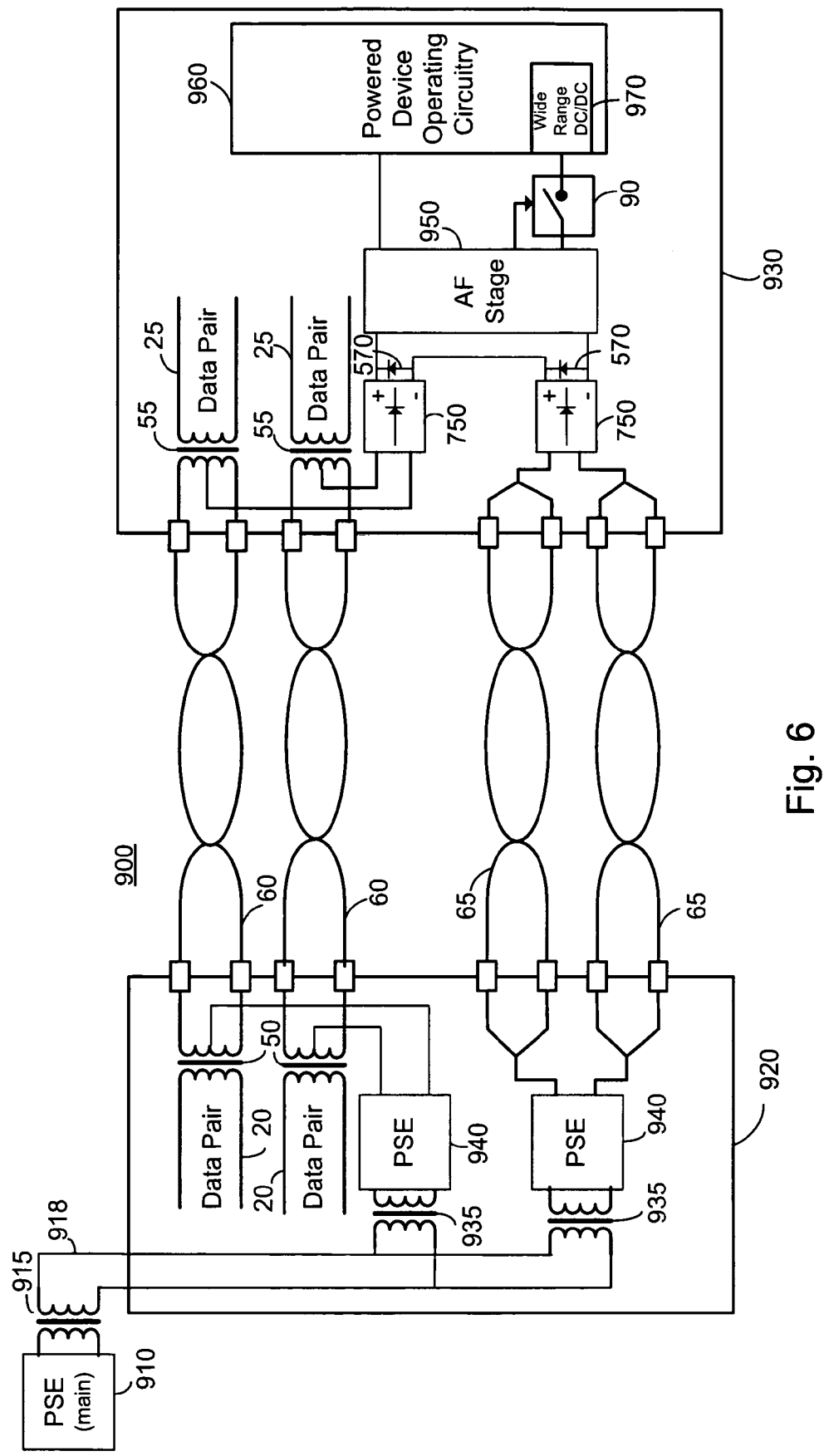
FIG. 6 illustrates a high level block diagram of an embodiment of a system providing high power that simultaneously functions to supply redundant low power according to the principle of the invention.

FIG. 6 illustrates a high level block diagram of an embodiment of a system 900 providing high power to a powered end station 930 while simultaneously supplying redundant low power according to the principle of the invention. Advantageously system 900 economically requires a single DC/DC converter while supporting high power. System 900 comprises an AC/AC power supply 910, a transformer 915, a high frequency AC bus 918, a high power/redundant power source 920, a first and second twisted pair data connection 60, a first and second spare twisted pair connection 65, and a powered end station 930. High power/redundant power source 920 comprises a first and second data pair 20, a first and second transformer 50, a first and second power transformer 935, and a first and second PSE 940. Powered end station 930 comprises a first and second transformer 55, a first and second data pair 25, a first and second diode 570, a first and second diode bridge 750, an AF stage 950, a switch 90, and a PD operating circuitry 960. PD operating circuitry 960 exhibits a wide range DC/DC converter 970. In an exemplary embodiment AF stage 950 comprises: switches 520, 540; signature impedance 530; classification current source 530; and control 760 of FIG. 3c.

The output of AC/AC power supply 910 is connected through transformer 915 to high frequency AC bus 918. First and second PSE 940 are each connected via respective transformers 935 to high frequency AC bus 918. First and second data pairs 20 are connected to the primary of respective first and second transformers 50, and the secondary of first and second transformers 50 are respectively connected to a first end of first and second twisted pair data connections 60. The output of first PSE 940 is connected to the center tap of the secondary of first transformer 50, and the return of first PSE 940 is connected to center tap of the secondary of second transformer 50. The output of second PSE 940 is connected to a first end of both leads of first spare twisted pair connections 65, and the return of second PSE 940 is connected to both leads of second spare twisted pair connections 65. It is to be noted that in the event of a gigabit Ethernet environment, first and second spare twisted connections 65 are meant to be third and fourth twisted pair data connections 60 without exceeding the scope of the invention.

The second end of first and second twisted pair connections 60 are respectively connected to the primary of first and second transformers 55. The secondary of first and second transformers 55 exhibit respective first and second data pairs 25. The center tap of the primary of each of first and second transformers 55 is connected to an input of first diode bridge 750. The positive output of first diode bridge 750 is connected to the input of AF stage 950. First diode 570 is connected across the output of first diode bridge 750 so as not to conduct in normal operation. The second end of both leads of first and second spare twisted pair connections 65 is connected respectively to inputs of second diode bridge 750. Second diode 570 is connected across the output of second diode bridge 750 so as not to conduct in normal operation. The negative lead of second diode bridge 750 is connected to the return of AF stage 950. The positive lead of second diode bridge 750 is connected to the negative lead of first diode bridge 750.

The positive output of AF stage 950 is connected to PD operating circuitry 960. Switch 90 is controlled by AF stage 950 and is operable to connect, or disconnect, the return from PD operating circuitry 960 to AF stage 950. Wide range DC/DC converter 970 is connected at the input to PD operating circuitry 960. In an exemplary embodiment, AF stage 950 is operable to provide detection and classification in accordance with IEEE 802.3af.

In operation AC/AC transformer 910 supplies a high frequency pulse width modulated AC to the input of first and second PSE 940. First PSE 940 is operatively connected to powered end station 930 via first and second twisted pair data connections 60. Second PSE 940 is operatively connected to powered end station 930 via first and second spare twisted pair connections 65. Preferably, first and second PSE 940 are fully isolated from each other. In the event that both first and second PSE 940 are supplying power, the outputs of first and second diode bridge 750 are added, and the input across AF stage 950 represent the combined voltage. This combined voltage is input to wide range DC/DC converter 970 and is operable to supply high power to PD operating circuitry 960. In the event that only one of first and second PSE 940 is supplying power, the voltage at AF stage 950 represents the voltage supplied by a single PSE 940. Wide range DC/DC converter 970 is thus operable to supply low power to PD operating circuitry 960. Either one of first and second PSE 940 is thus operable to supply standby power in the event of failure of the second of two PSE 940.

Detection and classification is preferably accomplished in accordance with the high level flow chart of any of FIGS. 4a-4c, in which detection and classification are accomplished on both paths prior to operation. In an alternative embodiment, second PSE 940 does not accomplish detection and classification, and supplies redundant power under command of first PSE 940.

The combiner of pending U.S. patent application Ser. No. 10/761,327 filed Jan. 22, 2004, whose contents have been incorporated by reference, may be advantageously be utilized in combination with the redundant powering system of the subject application. In particular, in the event that both main PSE 320 and spare PSE 330 of any of FIGS. 2a-2c are fed to combiner 220 of FIGS. 3a-3d of the above patent application, high power output will be achieved. In the event of a failure of one of main PSE 320 and spare PSE 330, low power operation will occur.

In such an embodiment, there is no requirement that classification of both paths be identical. The combination of two different classifications enable main PSE 320 and spare PSE 330 to identify any of numerous combinations thus enabling greater granularity in power classification.

FIG. 7 illustrates a flow chart of the operation of switch/hub equipment 310 and midspan equipment 410 of FIGS. 2a-2c according to the principle of the invention when the type of powered end station is unknown. In particular, the connected powered end station may comprise a legacy powered end station such as powered end station 70 or the PD of FIG. 3c, or a high power end station such as powered end station 930.

In stage 3000 a main PSE detects a valid PD impedance. In stage 3010 a spare PSE detects a valid PD impedance. In stage 3020 the detected impedance are reviewed. In the event that the detected impedance are not both valid PD impedances, in stage 3030 the detected impedances are again reviewed to determine if a single valid PD impedance has been detected. In the event that in stage 3030 no valid PD impedance has been detected, stage 3000 is repeated.

In the event that in stage 3030 a single valid PD impedance has been detected, in stage 3040 optional classification is done by the PSE that has detected a valid PD impedance. In stage 3050, power is turned on to the valid PD.

In the event that in stage 3020, both the main PSE and the spare PSE detected valid PD impedances, in stage 3060 simultaneous detection by both the main PSE and the spare PSE is accomplished. In stage 3070 the result of the simultaneous detection is reviewed. In the event that the main PSE and the spare PSE did not both received valid detection results during the simultaneous detection of stage 3060, in stage 3080 a single connected legacy load, such as any of PD 70 of FIGS. 1a-1c, 5 and the PD of FIG. 3c, has been detected. A legacy load, which meets the specifications of IEEE 802.3af is herein also termed an AF load. In stage 3090 optional classification of the single valid AF load is attempted by the main PSE. In stage 3100 power is turned on to the single valid AF load by the main PSE. It is to be noted that since a single valid AF load has been detected, classification by the spare PSE is not required. In stage 3110, the spare PSE is enabled thereby supplying redundant or back-up power in the event of the failure of the main PSE.

In the event that in stage 3070 both the main PSE and the spare PSE reported valid results during the simultaneous detection of stage 3060, in stage 3120 a high power load as described in U.S. patent application Ser. No. 10/761,307, or a single load exhibiting redundancy at least in the signature and preferably the classification path as described above in relation to FIGS. 3a and 3b has been detected. Such a redundancy may include full redundancy up to the switch as shown in FIGS. 3a and 3b, with or without MPS maintainer 590.

In stage 3130 optional classification is attempted by the main PSE. In stage 3140 optional classification is attempted by the spare PSE. It is to be understood that the main PSE and the spare PSE may read different classifications. In an exemplary embodiment, the load is identified as a high power or redundant AF load in response to the results of the classifications of stages 3130 and 3140.

In stage 3150 power from the main PSE is enabled. In stage 3160 power from the spare PSE is enabled. In the event that a high power load was detected based on the classification results of stages 3130 and 3140 above, power is delivered by the spare PSE simultaneously with power from the main PSE. In the event of a redundant AF load, the spare PSE is maintained as back-up or redundant power, preferably by setting the voltage output of the spare PSE to a voltage lower than the voltage output setting of the main PSE.

Thus the present embodiments enable redundant powering of a PD by providing at least two PSEs each having a separate path over communication cabling for powering the PD. In the event of an outage of a first one of the two PSEs, or of the failure of any portion of the path from the first one of the two PSEs, power is supplied by the second of the two PSEs. In one embodiment the second of the two PSEs, operating as a backup, spare, reserve or redundant PSE, receives a valid maintain power signature from the PD thus ensuring availability. In another embodiment the second of the two PSEs receives data regarding the operation of the first PSE, and ensures availability on the back-up path in the absence of a valid maintain power signature. Preferably and advantageously, the redundant PSE exhibits an active power output irrespective of a valid MPS, thus power may be drawn immediately upon failure of the first PSE without requiring a subsequent detection Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

We claim:

1. A redundant powering system for a powered device receiving power over communication cabling, the redundant powering system comprising:

a redundant power supply comprising a first power sourcing equipment and a second power sourcing equipment;

a powered device; and communication cabling connecting said redundant power supply to said powered device, said communication cabling comprising a first path connecting said first power sourcing equipment to said powered device and a second path connecting said second power sourcing equipment to said powered device, said first and second paths at least partially being constituted of a single structured cable wherein said first path is constituted of different conductors within said single structured cable than said second path, said powered device comprising at least one signature impedance, said redundant power supply being operative so that power is operably supplied to said powered device from only one of said first and second power sourcing equipment, and wherein at least one of said first power sourcing equipment and said second power sourcing equipment is operative to perform detection of said at least one signature impedance.

2. A redundant powering system according to claim 1, wherein said first power sourcing equipment is operative to supply power via said first path to said powered device and said second power sourcing equipment is operative to remain in a standby mode, said second power sourcing equipment being operative to supply power to said powered device only in the event that said first power sourcing equipment does not supply power to said powered device.

3. A redundant powering system according to claim 2, wherein said powered device comprises a maintain power signature circuit operative to generate a maintain power signature on said second path, said second power sourcing equipment remaining in said standby mode at least partially responsive to said generated maintain power signature.

4. A redundant powering system according to claim 2, wherein said standby mode comprises an active power output.

5. A redundant powering system according to claim 1, wherein said first power sourcing equipment and said second power sourcing equipment are each operative to perform detection of said at least one signature impedance, said first power sourcing equipment and said second power sourcing equipment being operative to perform said detection at non-overlapping times.

6. A redundant powering system according to claim 1, wherein said first power sourcing equipment and said second power sourcing equipment are located within separate chassis.

7. A redundant powering system according to claim 1, wherein said first power sourcing equipment and said second power sourcing equipment are interchangeable.

8. A redundant powering system according to claim 1, wherein said powered device comprises:
   a first diode bridge operatively connected to said first path;
   a second diode bridge operatively connected to said second path; and
   operating circuitry,
   the outputs of said first and second diode bridges being operatively connected to said operating circuitry via a common connection.

9. A redundant power system according to claim 1, wherein at least one of said first power sourcing equipment and said second power sourcing equipment is integral with switch/hub equipment.

10. A redundant power system according to claim 1, wherein at least one of said first power sourcing equipment and said second power sourcing equipment is integral with midspan power insertion equipment.

11. A method of redundant powering of a powered device over communication cabling comprising:
   supplying a first power sourcing equipment;
   supplying a second power sourcing equipment;
   supplying a powered device comprising at least one signature impedance;
   supplying communication cabling connecting said first power sourcing equipment and said second power sourcing equipment to said powered device, said communication cabling comprising a first path connecting said first power sourcing equipment to said powered device and a second path connecting said second power sourcing equipment to said powered device, said first path and said second path being part of a single common cable wherein said first path is constituted of different conductors within said single common cable than said second path;
   detecting by said first power sourcing equipment said signature impedance;
   powering said powered device from said first power sourcing equipment via said first path; and
   in the event of failure of said first power sourcing equipment to supply power via said first path, powering said at least one powered device from said second power sourcing equipment via said second path without requiring detection subsequent to said failure event.

12. A method of redundant powering according to claim 11, further comprising detecting by said second power sourcing equipment said at least one signature impedance, said detecting by said second power sourcing equipment being prior to said failure event.

13. A method of redundant powering according to claim 12, wherein said detecting by said first power sourcing equipment and said detecting by said second power sourcing equipment are at non-overlapping times.

14. A method of redundant powering according to claim 11, wherein said provided first power sourcing equipment and said provided second power sourcing equipment are located within separate chassis.

15. A method of redundant powering according to claim 11, wherein said provided first power sourcing equipment and said provided second power sourcing equipment are interchangeable.

16. A method of redundant powering according to claim 11, further comprising operatively connecting the output of said first path to the output of said second path via at least one diode bridge so as to power a load of said provided at least powered device.

17. A method of redundant powering according to claim 11, further comprising maintaining said second power sourcing equipment in a standby mode.

18. A method of redundant powering according to claim 17, further comprising providing a maintain power signature via said second path to said second power sourcing equipment, said second power sourcing equipment being maintained in said standby mode at least partially responsive to said maintain power signature.

19. A method of redundant powering according to claim 11, wherein at least one of said provided first power sourcing equipment and said provided second power sourcing equipment is integral with switch/hub equipment.

20. A method of redundant powering according to claim 11, wherein at least one of said provided first power sourcing equipment and said provided second power sourcing equipment is integral with midspan power insertion equipment.

21. A redundant powering system comprising:
   a first power sourcing equipment;
   a second power sourcing equipment interchangeable with said first power sourcing equipment;
   a powered device;
   a first path comprising a communication cabling connecting said first power sourcing equipment to said powered device; and
   a second path connecting said second power sourcing equipment to said powered device, said first and second paths at least partially being constituted of different respective conductors of a single structured cable of the communication cabling,
   wherein said powered device comprises at least one signature impedance, and wherein power is supplied to said powered device from said first power sourcing equipment via said first path and said second power sourcing equipment is operative to remain in a standby mode, said second power sourcing equipment being operative to supply power to said powered device via said second path only in the event that said first power sourcing equipment does not supply power to said powered device, said second power sourcing equipment supplying said power without requiring detection subsequent to said first power sourcing equipment not supplying power.

* * * * *